US012684138B2

(12) United States Patent (10) Patent No.: US 12,684,138 B2
Gan et al. (45) Date of Patent: Jul. 14, 2026

(54) VIDEO CODING METHOD, ENCODER AND DECODER

(71) Applicant: GUANGDONG OPPO MOBILE TELECOMMUNICATIONS CORP., LTD., Dongguan (CN)

(72) Inventors: Jonathan Gan, Palo Alto, CA (US); Yue Yu, Palo Alto, CA (US); Haoping Yu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 19/108,029

(22) PCT Filed: Sep. 5, 2023

(86) PCT No.: PCT/US2023/031952
§ 371 (c)(1),
(2) Date: Feb. 28, 2025

(87) PCT Pub. No.: WO2024/054419
PCT Pub. Date: Mar. 14, 2024

(65) Prior Publication Data
US 2025/0386031 A1    Dec. 18, 2025

Related U.S. Application Data

(60) Provisional application No. 63/375,031, filed on Sep. 8, 2022.

(51) Int. Cl.
H04N 19/159    (2014.01)
H04N 19/119    (2014.01)
(Continued)

(52) U.S. Cl.
CPC ......... *H04N 19/159* (2014.11); *H04N 19/119* (2014.11); *H04N 19/176* (2014.11); *H04N 19/196* (2014.11)

(58) Field of Classification Search
CPC ................................................... H04N 19/159
(Continued)

(56) References Cited

U.S. PATENT DOCUMENTS

2022/0007041 A1 *  1/2022  Li ........................ H04N 19/176
2023/0188709 A1 *  6/2023  Sim ...................... H04N 19/105
375/240.02

OTHER PUBLICATIONS

International Search Report in the international application No. PCT/US2023/031952, mailed on Dec. 13, 2023, 2 pages.
(Continued)

*Primary Examiner* — Amir Shahnami
(74) *Attorney, Agent, or Firm* — BAYES PLLC

(57) ABSTRACT

A video coding method, an encoder, and a decoder are disclosed. The method is applied to a decoder and comprises retrieving a bitstream corresponding to a current frame and parsing the bitstream to obtain a current coding tree unit (CTU) of the current frame; determining an availability of at least one neighbouring CTU of the current CTU in the current frame according to a wavefront delay, wherein the wavefront delay is a delay in units of CTUs in a row direction between the current CTU at a current CTU row and the neighbouring CTU at a previous CTU row which are decoded in parallel; determining a prediction block in the at least one neighbouring CTU for a current coding unit (CU) in the current CTU; and decoding the current CU using the prediction block.

20 Claims, 16 Drawing Sheets

(51) Int. Cl.
   *H04N 19/176* (2014.01)
   *H04N 19/196* (2014.01)

(58) Field of Classification Search
   USPC ..................................................... 375/240.12
   See application file for complete search history.

(56) References Cited

OTHER PUBLICATIONS

Written Opinion of the International Search Authority in the international application No. PCT/US2023/031952, mailed on Dec. 13, 2023, 4 pages.

B. Bross, J. Chen, S. Liu, Y. K. Wang, "Versatile Video Coding Editorial Refinements on Draft 10", Document of Joint Video Experts Team of ITU-T SG 16 WP 3 and ISO/IEC JTC 1/SC29, JVET-T2001_v2, 20th Meeting by teleconference, Oct. 7-16, 2020, pp. 13-120.

F. Bossen, B. Bross, T. Ikai, D. Rusanovskyy, G. Sullivan, Y. K. Wang, "VVC operationrange extensions (Draft 5)", Document of Joint Video Experts Team of ITU-T SG 16 WP 3 and ISO ЛЕС JTC I/SC 29, JVET-X2005-v1, 24th Meeting by teleconference, Oct. 6-15, 2021, pp. 1-32.

J. Xu, N. Zhang, "EE2-3.2: IBC Reference Area Extension", Document of Joint Video Experts Team of ITU-T SG 16 WP 3 and ISO/EC JTC I/SC 29, JVET-Z0153-v1, 26th Meeting by teleconference, Apr. 20-29, 2022, pp. 1-3.

J. Xu, Y. Wang, "EE2-1.7: IBC Adaptation for Camera-Captured Content", Document of Joint Video Experts Team of ITU-T SG 16 WP 3 and ISO/IEC JTC I/SC 29, JVET-AA0106-v3, 27th Meeting by teleconference, Jul. 13-22, 2022, pp. 1-4.

* cited by examiner

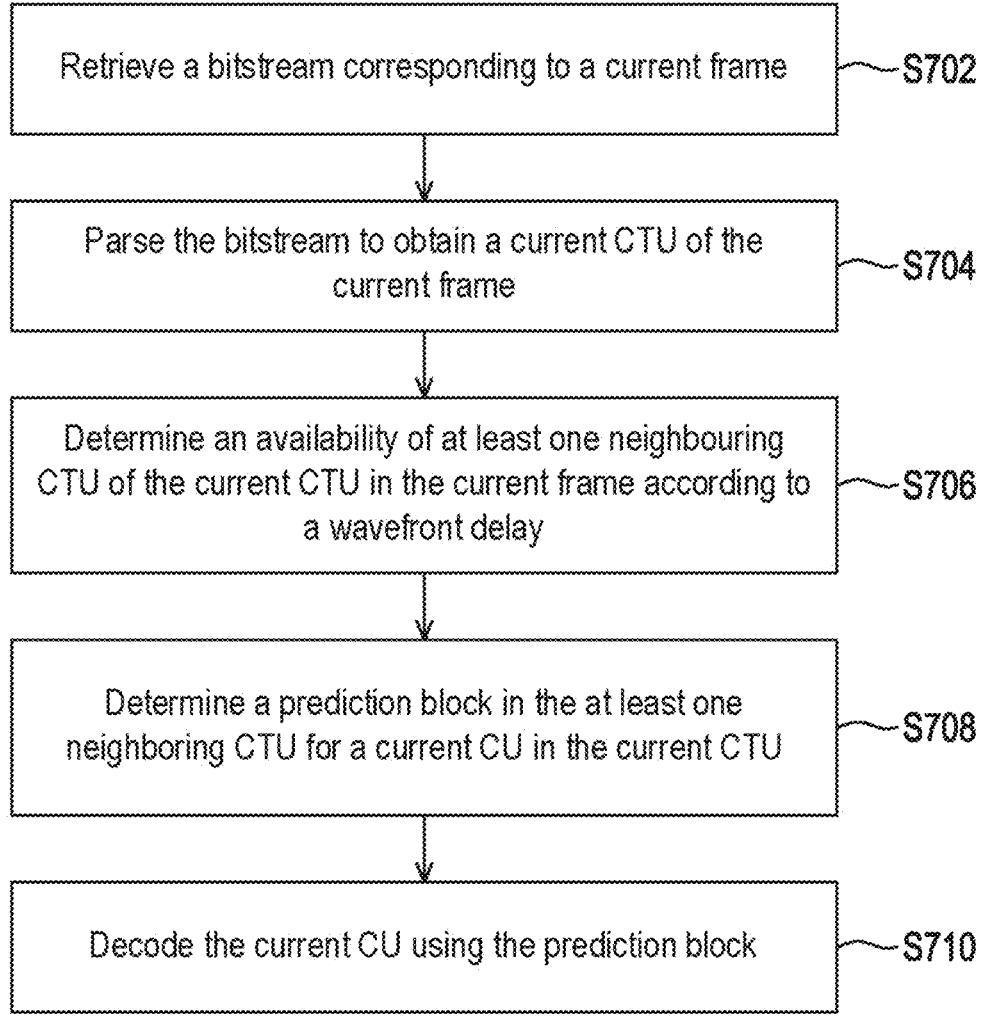

Retrieve a bitstream corresponding to a current frame ⟵S702

Parse the bitstream to obtain a current CTU of the current frame ⟵S704

Determine an availability of at least one neighbouring CTU of the current CTU in the current frame according to a wavefront delay ⟵S706

Determine a prediction block in the at least one neighboring CTU for a current CU in the current CTU ⟵S708

Decode the current CU using the prediction block ⟵S710

FIG. 7

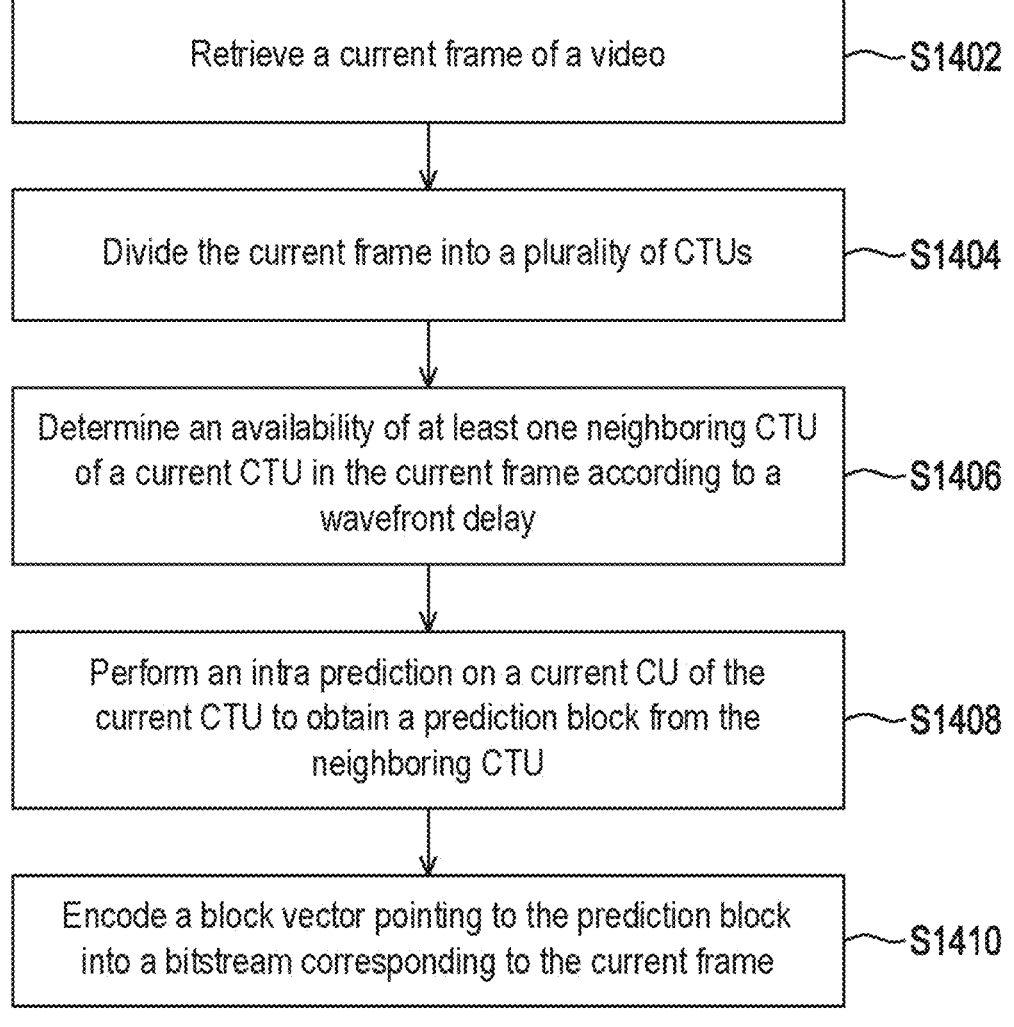

Retrieve a current frame of a video    ~S1402

Divide the current frame into a plurality of CTUs    ~S1404

Determine an availability of at least one neighboring CTU of a current CTU in the current frame according to a wavefront delay    ~S1406

Perform an intra prediction on a current CU of the current CTU to obtain a prediction block from the neighboring CTU    ~S1408

Encode a block vector pointing to the prediction block into a bitstream corresponding to the current frame    ~S1410

FIG. 14

VIDEO CODING METHOD, ENCODER AND DECODER

CROSS-REFERENCE TO RELATED APPLICATION

This application is a 35 U.S.C. 371 national stage filing of International Application No. PCT/US2023/031952 filed on Sep. 5, 2023, which claims the priority benefits of U.S. provisional application Ser. No. 63/375,031, filed on Sep. 8, 2022. The entireties of each of the above-mentioned patent application are hereby incorporated by reference herein and made a part of this specification.

BACKGROUND OF THE DISCLOSURE

Field of the Disclosure

The disclosure relates generally to video coding, the disclosure relates to a video coding method, an encoder, and a decoder.

Description of Related Art

Digital video capabilities can be incorporated into a wide range of devices, including digital television, digital live broadcast systems, wireless broadcast systems, personal digital assistants (PDAs), laptop or desktop computers, tablet computers, e-books Readers, digital cameras, digital recording devices, digital media players, video game devices, video game consoles, cellular or satellite radio telephones, video conferencing devices, video streaming devices, and the like.

Digital video devices implement video compression techniques such as those developed by Moving Picture Experts Group (MPEG)-2, MPEG-4, ITU-TH.263, ITU-TH.264, Advanced Video Coding (AVC), or High Efficiency Video Coding (HEVC), so as to be more efficient to transmit and receive digital video information. Video devices may transmit, receive, encode, decode, and/or store digital video information more efficiently by implementing these video coding techniques.

With the proliferation of Internet video, despite the continuous evolution of digital video compression technology, it still puts forward higher requirements for video compression efficiency.

SUMMARY OF THE INVENTION

The embodiments of the present application provide a video coding method, an encoder, and a decoder, which allow the bitstream to be decoded in parallel with improved intra prediction.

In a first aspect, an embodiment of the present application provides a video coding method applied to a decoder. The video coding method comprises retrieving a bitstream corresponding to a current frame and parsing the bitstream to obtain a current coding tree unit (CTU) of the current frame; determining an availability of at least one neighbouring CTU of the current CTU in the current frame according to a wavefront delay, wherein the wavefront delay is a delay in units of CTUs in a row direction between the current CTU at a current CTU row and the neighbouring CTU at a previous CTU row which are decoded in parallel; determining a prediction block in the at least one neighbouring CTU for a current coding unit (CU) in the current CTU; and decoding the current CU using the prediction block.

According to one embodiment, in decoding a first CTU of the current CTU row, the method further comprising inheriting state information at the latest from a completion of a neighbouring CTU at the previous CTU row with a delay of $N-1$ CTUs in the row direction when the wavefront delay is N CTUs.

According to one embodiment, the step of determining an availability of at least one neighbouring CTU of the current CTU in the current frame according to a wavefront delay comprises, for a current $CTU_{i,j}$ at $i^{th}$ CTU row and $j^{th}$ CTU column, determining a neighbouring $CTU_{a,b}$ at $a^{th}$ CTU row and $b^{th}$ CTU column as being unavailable if $b-j \geq (i-a) \times N$ when the wavefront delay is N CTUs.

According to one embodiment, the availability of at least one neighbouring CTU of the current CTU in the current frame is determined according to the wavefront delay in response to a sequence parameter set (SPS) level syntax element being enabled.

According to one embodiment, the step of determining an availability of at least one neighbouring CTU of the current CTU in the current frame according to a wavefront delay comprises, for a current $CTU_{i,j}$ at $i^{th}$ CTU row and $j^{th}$ CTU column, determining an intra block copy (IBC) reference area comprising a plurality of neighbouring CTUs within a fixed range from the current $CTU_{i,j}$, and determining a neighbouring $CTU_{a,b}$ at $a^{th}$ CTU row and $b^{th}$ CTU column in the IBC reference area as being unavailable if $b-j \geq (i-a) \times N$ when the wavefront delay is N CTUs.

According to one embodiment, the IBC reference area comprises a neighbouring $CTU_{i-2,k}$ from two CTU rows above the $i^{th}$ CTU row for $(j-2) \leq k \leq (j+1)$, a neighbouring $CTU_{i-1,k}$ from one CTU row above the $i^{th}$ CTU row for $(j-2) \leq k \leq (j+1)$, and a neighbouring $CTU_{i,k}$ for $(j-2) \leq k \leq (j-1)$.

According to one embodiment, the IBC reference area comprises a neighbouring $CTU_{i-1,k}$ from one CTU row above the $i^{th}$ CTU row for $(j-1) \leq k$, and a neighbouring $CTU_{i,k}$ for $k < j$.

According to one embodiment, the IBC reference area comprises a neighbouring $CTU_{i-2,k}$ from two CTU rows above the $i^{th}$ CTU row for $(j-2) \leq k$, a neighbouring $CTU_{i-1,k}$ from one CTU row above the $i^{th}$ CTU row for any k, and a neighbouring $CTU_{i,k}$ for $k < j$.

According to one embodiment, the step of determining a prediction block in the at least one neighbouring CTU for a current CU in the current CTU comprises decoding an IBC block vector from the bitstream; and determining the prediction block in the at least one neighbouring CTU within the IBC reference area for the current CU using the IBC block vector, wherein the IBC block vector is determined as illegal if the IBC block vector points to an area outside the IBC reference area, modified to point to in area inside the IBC reference area by a mapping function, or binarised to a codeword space that is bounded within limits of the IBC reference area.

In a second aspect, an embodiment of the present application provides a decoder comprising a communication interface, a storage device, and a processor. The communication interface is configured to retrieve a bitstream corresponding to a current frame. The storage device is configured to store at least one computer executable instruction. The processor is coupled to the communication interface and the storage device, and configured to execute the at least one computer executable instruction to parse the bitstream to obtain a current coding tree unit (CTU) of the current frame, determine an availability of at least one neighbouring CTU of the current CTU in the current frame according to a wavefront delay, wherein the wavefront delay is a delay in units of CTUs in a row direction between the current CTU at a current CTU row and the neighbouring CTU at a previous CTU row which are decoded in parallel, determine a prediction block in the at least one neighbouring CTU for a current coding unit (CU) in the current CTU, and decode the current CU using the prediction block.

According to one embodiment, the processor is configured to inherit state information at the latest from a completion of a neighbouring CTU at the previous CTU row with a delay of N−1 CTUs in the row direction when the wavefront delay is N CTUs in decoding a first CTU of the current CTU row.

According to one embodiment, for a current $CTU_{i,j}$ at $i^{th}$ CTU row and $j^{th}$ CTU column, the processor is configured to determine a neighbouring $CTU_{a,b}$ at $a^{th}$ CTU row and $b^{th}$ CTU column as being unavailable if $b−j≥(i−a)×N$ when the wavefront delay is N CTUs.

According to one embodiment, for a current $CTU_{i,j}$ at $i^{th}$ CTU row and $j^{th}$ CTU column, the processor is configured to determine an IBC reference area comprising a plurality of neighbouring CTUs within a fixed range from the current $CTU_{i,j}$, and determine a neighbouring $CTU_{a,b}$ at $a^{th}$ CTU row and $b^{th}$ CTU column in the IBC reference area as being unavailable if $b−j≥(i−a)×N$ when the wavefront delay is N CTUs.

According to one embodiment, the processor is configured to decode an IBC block vector from the bitstream, and determine the prediction block in the at least one neighbouring CTU within the IBC reference area for the current CU using the IBC block vector, wherein the IBC block vector is determined as illegal if the IBC block vector points to an area outside the IBC reference area, modified to point to in area inside the IBC reference area by a mapping function, or binarised to a codeword space that is bounded within limits of the IBC reference area.

In a third aspect, an embodiment of the present application provides a video coding method applied to an encoder. The video coding method comprising retrieving a current frame of a video; dividing the current frame into a plurality of CTUs; determining an availability of at least one neighbouring CTU of a current CTU in the current frame according to a wavefront delay, wherein the wavefront delay is a delay in units of CTUs in a row direction between the current CTU at a current CTU row and the neighbouring CTU at a previous CTU row which are coded in parallel; performing an intra prediction on a current CU of the current CTU to obtain a prediction block from the at least one neighbouring CTU; and encoding a block vector pointing to the prediction block into a bitstream corresponding to the current frame.

According to one embodiment, the step of determining an availability of at least one neighbouring CTU of the current CTU in the current frame according to a wavefront delay comprises, for a current $CTU_{i,j}$ at $i^{th}$ CTU row and $j^{th}$ CTU column, determining a neighbouring $CTU_{a,b}$ at $a^{th}$ CTU row and $b^{th}$ CTU column as being unavailable if $b−j≥(i−a)×N$ when the wavefront delay is N CTUs.

According to one embodiment, the step of determining an availability of at least one neighbouring CTU of the current CTU in the current frame according to a wavefront delay comprises, for a current $CTU_{i,j}$ at $i^{th}$ CTU row and $j^{th}$ CTU column, determining an IBC reference area comprising a plurality of neighbouring CTUs within a fixed range from the current $CTU_{i,j}$, and determining a neighbouring $CTU_{a,b}$ at $a^{th}$ CTU row and $b^{th}$ CTU column in the IBC reference area as being unavailable if $b−j≥(i−a)×N$ when the wavefront delay is N CTUs.

In a fourth aspect, an embodiment of the present application provides an encoder comprising a communication interface, a storage device, and a processor. The communication interface is configured to retrieve a current frame of a video. The storage device is configured to store at least one computer executable instruction. The processor is coupled to the communication interface and the storage device, and configured to execute the at least one computer executable instruction to divide the current frame into a plurality of CTUs; determine an availability of at least one neighbouring CTU of a current CTU in the current frame according to a wavefront delay, wherein the wavefront delay is a delay in units of CTUs in a row direction between the current CTU at a current CTU row and the neighbouring CTU at a previous CTU row which are coded in parallel; perform an intra prediction on a current CU of the current CTU to obtain a prediction block from the at least one neighbouring CTU; and encode a block vector pointing to the prediction block into a bitstream corresponding to the current frame.

According to one embodiment, for a current $CTU_{i,j}$ at $i^{th}$ CTU row and $j^{th}$ CTU column, the processor is configured to determine a neighbouring $CTU_{a,b}$ at $a^{th}$ CTU row and $b^{th}$ CTU column as being unavailable if $b−j≥(i−a)×N$ when the wavefront delay is N CTUs.

According to one embodiment, for a current $CTU_{i,j}$ at $i^{th}$ CTU row and $j^{th}$ CTU column, the processor is configured to determine an IBC reference area comprising a plurality of neighbouring CTUs within a fixed range from the current $CTU_{i,j}$, and determine a neighbouring $CTU_{a,b}$ at $a^{th}$ CTU row and $b^{th}$ CTU column in the IBC reference area as being unavailable if $b−j≥(i−a)×N$ when the wavefront delay is N CTUs.

According to one embodiment, the residual restoring unit restores the residual levels of the color components of each of the plurality of points by calculating a product of the decoded signs multiplied by the absolute level of the decoded levels of the residual level of the color components.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3B is a schematic diagram of partitioning a CTU into CUs according to one embodiment of the disclosure.

FIG. 7 is a flowchart of a coding method applied to a decoder according to one embodiment of the disclosure.

FIG. 14 is a flowchart of a video coding method applied to a decoder according to one embodiment of the disclosure.

DESCRIPTION OF THE EMBODIMENTS

Figure 1:
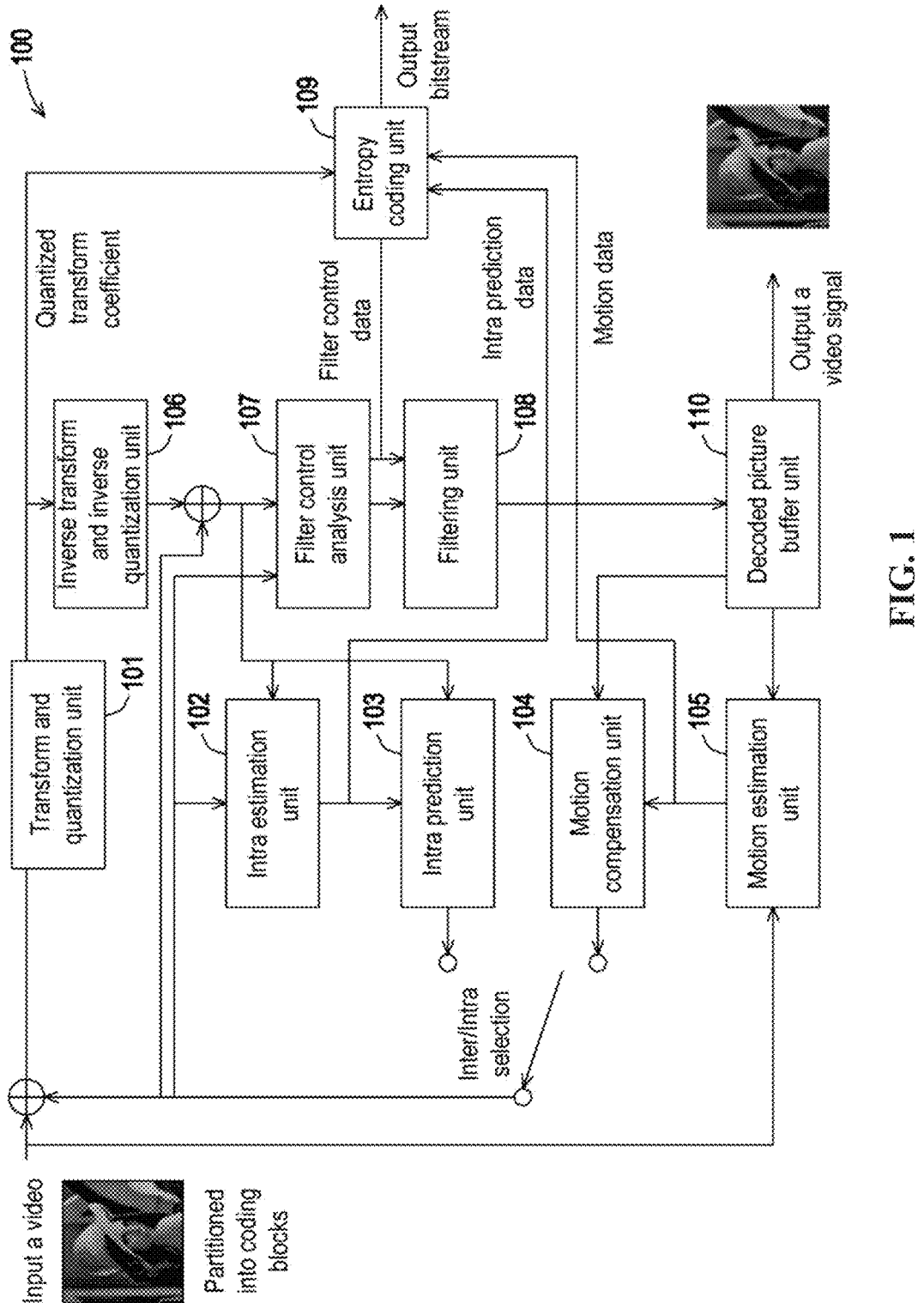
FIG. 1 is a schematic structural diagram of a video encoding system according to one embodiment of the disclosure.

In order to have a more detailed understanding of the characteristics and technical content of the embodiments of the present application, the implementation of the embodiments of the present application will be described in detail below with reference to the accompanying drawings. The attached drawings are for reference and explanation purposes only, and are not used to limit the embodiments of the present application.

The disclosure proposes methods for several aspects which modify the reference area for the intra block copy (IBC) tool, and for intra prediction tools in general, in order to support the wavefront parallel processing (WPP) feature. These aspects include: restrictions on state propagation and CTU availability to enable WPP; modification to intra prediction reference area; and the treatment of IBC block vectors. The proposed methods may be used in future video coding standards.

Encoding a video is to encode each frame of the video, frame by frame to a bitstream. Similarly, decoding the video bitstream after a video is encoded and compressed is to decode the bitstream frame by frame. Each frame may also be referred to as a picture, and the video may be referred to as a sequence of pictures. To effectively compress the video, the bitstream order, and therefore the decoded order of the pictures may be different from the order in which the pictures are displayed. The reordering of picture order into a hierarchy suitable for compression is generally performed over groups of pictures such as 8, 16, or 32 pictures.

Modern international video coding standards typically describe block-based hybrid methods for decoding bitstreams. For example, the High Efficiency Video Coding (HEVC) and Versatile Video Coding (VVC) standards are block-based hybrid spatial and temporal predictive coding schemes. That is, to produce such bitstreams when encoding each picture, the picture is required to be partitioned into a quantity of blocks and then encode each of these blocks one by one. For regularity of hardware implementation, a picture is usually first partitioned into Largest Coding Units (LCUs)

or Coding Tree Units (CTUs) with the same size of N×N pixels which are arranged in raster-scan order across the picture, and then each CTU is further partitioned into a plurality of blocks referred to as Coding Units (CUs) with not necessarily the same size. Therefore, encoding a video picture sequence is to encode each CU of each picture in turn, and decoding a bitstream of a video picture sequence is also to decode each CU of each picture in turn, finally reconstructing a whole video picture sequence.

To adapt to different picture contents and properties of each portion in a picture, the most effective coding may be carried out in a targeted manner. Sizes of CUs in the picture may be different, some are 8*8 pixels, some are 64*64 pixels, and so on. A shape of the CU may be rectangular, and various CUs may have different shapes and sizes in one picture. For example, a picture is first partitioned into CTUs of exactly the same size with 64*64 pixels, that is, N=64, wherein one CTU is composed of three CUs with 32*32 pixels and four CUs with 16*16 pixels, while the other CTU is composed of two CUs with 32*32 pixels, three CUs with 16*16 pixels, and 20 CUs with 8*8 pixels. A CU may be further partitioned into several sub-regions. A sub-region includes, but is not limited to, a Prediction unit (PU) and a Transform unit (TU). To sum up, a coding block or a decoding block refers to a region in a picture that is encoded or decoded.

FIG. 1 is a schematic structural diagram of a video encoding system according to one embodiment of the disclosure. As illustrated in FIG. 1, the video encoding system 100 includes a transform and quantization unit 101, an intra estimation unit 102, an intra prediction unit 103, a motion compensation unit 104, a motion estimation unit 105, an inverse transform and inverse quantization unit 106, a filter control analysis unit 107, a filtering unit 108, an entropy coding unit 109, and a decoded picture buffer unit 110. The filtering unit 108 may implement one or several in-loop filtering operations, such as deblocking, sample adaptive offset (SAO), adaptive loop filtering (ALF) based on Wiener filter estimation, bilateral filtering, and neural network loop filtering (NNLF). The entropy coding unit 109 may implement header information coding and context-based adaptive binary arithmetic coding (CABAC).

For an input video, a coding tree unit (CTU) may be obtained through preliminary partitioning, and CUs may be obtained by applying content adaptive partitioning to one CTU. The CU consists of one or more coding blocks (CB), where each coding block corresponds to a colour component of the video. Then, for the residual pixel information obtained after intra prediction or inter prediction, the coding block is transformed by the transform and quantization unit 201, including transforming the residual information from the pixel domain to the transform domain, and the obtained transform coefficients are quantized, to further reduce the bitrate.

The intra estimation unit 102 and the intra prediction unit 103 are used to perform intra-predictive coding of the coding block. In an example, the intra estimation unit 102 and the intra prediction unit 103 are used to determine an intra prediction mode to be used to encode the coding block. The motion compensation unit 104 and the motion estimation unit 105 are used to perform inter-predictive coding of the received coding block relative to one or more blocks in one or more reference pictures, to provide temporal prediction information. The motion estimation performed by the motion estimation unit 105 is a process of generating a motion vector, where the motion vector can estimate motion of the coding block. The motion compensation unit 104 is used to perform motion compensation based on the motion vector determined by the motion estimation unit 105. After the intra prediction mode is determined, the intra prediction unit 103 is used to provide the selected intra prediction data to the entropy coding unit 109 and the motion estimation unit 105 is used to send the calculated motion vector data to the entropy coding unit 109.

The inverse transform and inverse quantization unit 106 is used for reconstruction of the coding block. A residual block is reconstructed in the pixel domain, and blocking artifacts of the reconstructed residual block are removed through the filter control analysis unit 107 and the filtering unit 108, and then the reconstructed residual block is added to a prediction of the picture in the decoded picture buffer unit 110, to generate a reconstructed coding block. The entropy coding unit 109 is used to encode various encoding parameters and quantized transform coefficients. In the CABAC-based encoding algorithm, the context can be based on neighbouring coding blocks, and the entropy coding unit 109 can be used to encode information indicating the determined intra prediction mode and output the bitstream of the video signal. The decoded picture buffer unit 110 is used to store reconstructed coding blocks, for prediction reference. As the picture encoding progresses, reconstructed coding blocks will be continuously generated, and these reconstructed coding blocks will be stored into the decoded picture buffer unit 110.

Figure 2:
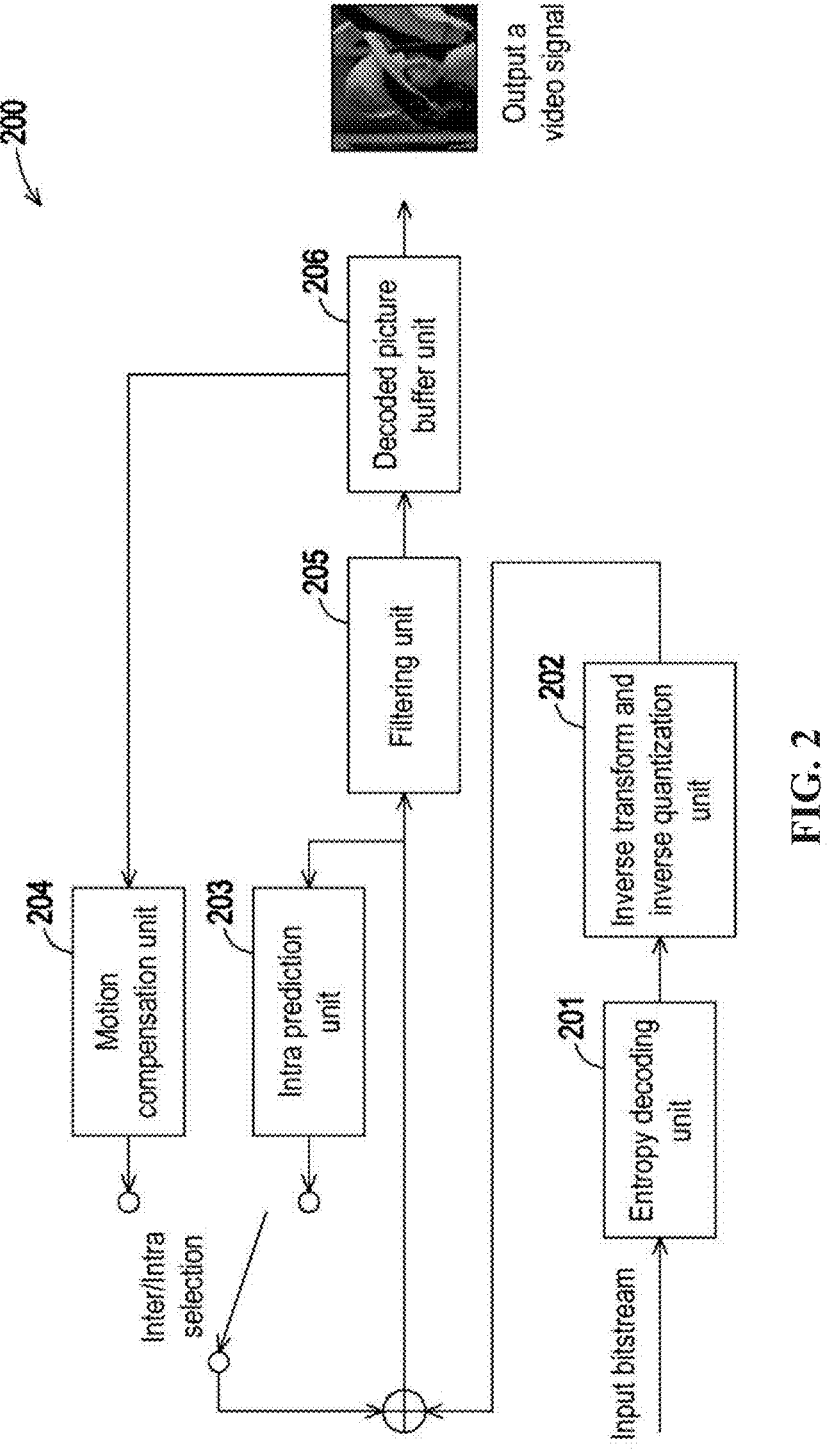
FIG. 2 is a schematic structural diagram of a video decoding system according to one embodiment of the disclosure.

FIG. 2 is a schematic structural diagram of a video decoding system according to one embodiment of the disclosure. As illustrated in FIG. 2, the video decoding system 200 includes but is not limited to an entropy decoding unit 201, an inverse transform and inverse quantization unit 202, an intra prediction unit 203, a motion compensation unit 204, a filtering unit 205, a decoded picture buffer unit 206. The entropy decoding unit 201 may implement header information decoding and CABAC. The filtering unit 205 may implement one or several in-loop filtering operations, such as deblocking, sample adaptive offset (SAO), adaptive loop filtering (ALF) based on Wiener filter estimation, bilateral filtering, and neural network loop filtering (NNLF).

After the input video signal is encoded, the bitstream of the video signal is output. The bitstream is input into the video decoding system 200. First, decoded transform coefficients are obtained through the entropy decoding unit 201. The decoded transform coefficients are processed by the inverse transform and inverse quantization unit 202, so as to generate a residual block in the pixel domain. The intra prediction unit 203 may be used to generate prediction data of the current coding block based on the determined intra prediction mode and data from the previous decoded block of the current frame or picture.

The motion compensation unit 204 is used to determine prediction information for the coding block by analyzing motion vectors and other associated syntax elements, and use the prediction information to generate a prediction of the coding block that is being decoded. The decoded block is formed by summing the residual block from the inverse transform and inverse quantization unit 202 and the corresponding prediction generated by the intra prediction unit 203 or the motion compensation unit 204. The blocking artifacts of the decoded video signal are removed through the filtering unit 205, which can improve quality of the video. The decoded block is then stored into the decoded picture buffer unit 206. The decoded picture buffer unit 206 is used to store reference pictures used for subsequent intra prediction or motion compensation, and is also used to output the video signal, that is, the restored original video signal is obtained.

Figure 3A:
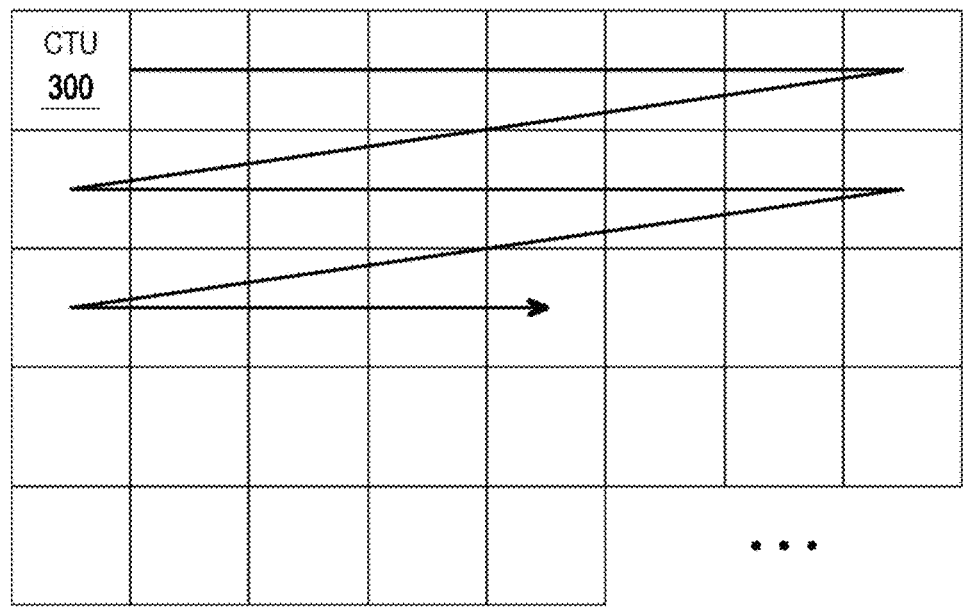
FIG. 3A is a schematic diagram of dividing a picture into blocks called CTUs according to one embodiment of the disclosure.

FIG. 3A is a schematic diagram of dividing a picture into blocks called CTUs according to one embodiment of the disclosure. As shown in FIG. 3A, a frame of picture is divided into a plurality of regions of the same size according to rows and columns, each region is called a CTU, wherein a side length of a CTU may be 128 pixels, 64 pixels, etc. Since the division is rigid in horizontal and vertical directions, there is no overlap between CTUs.

For example, the CTUs 300 are blocks of 128*128 pixels. Each CTU 300 in a picture may be partitioned into one or more CUs (Coding Units), which can be used for prediction and transform.

Figure 3B:
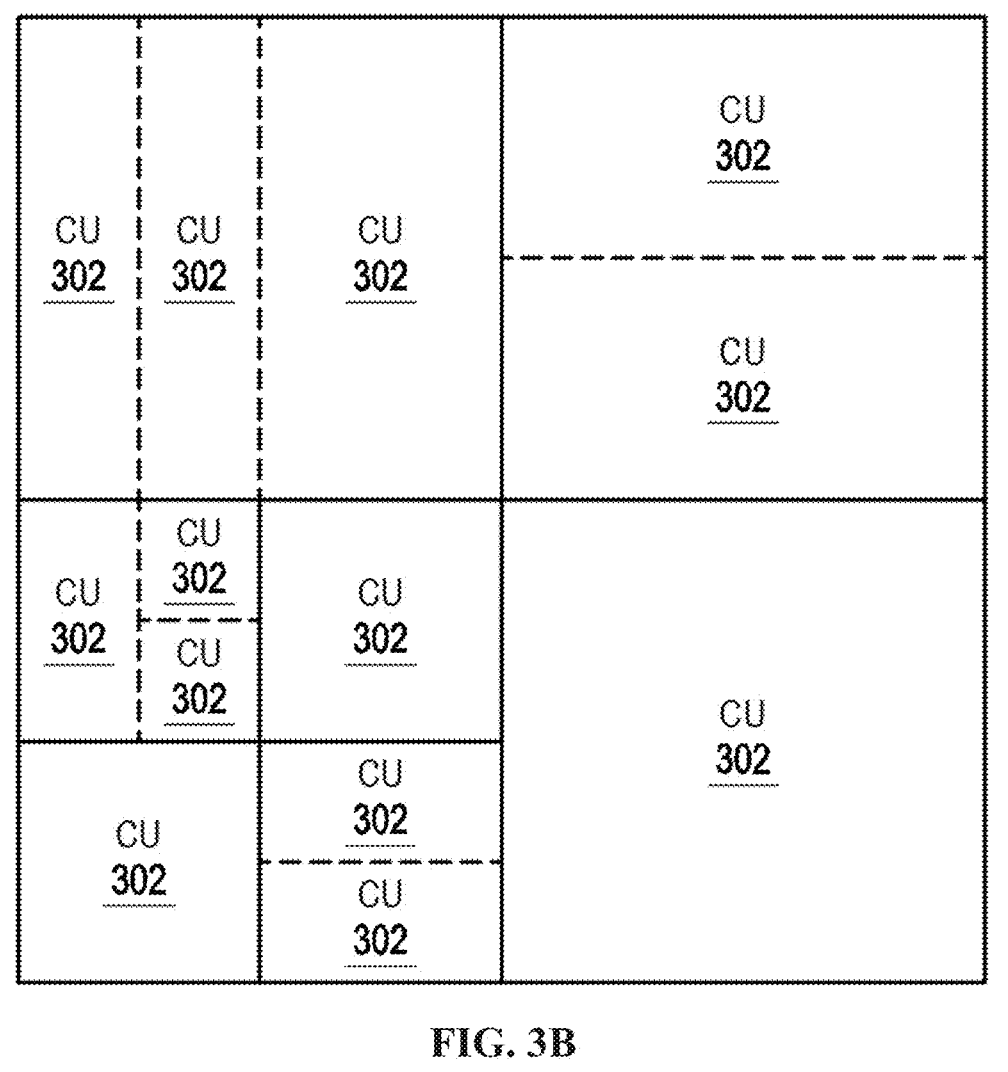

FIG. 3B is a schematic diagram of partitioning a CTU into CUs according to one embodiment of the disclosure. As shown in FIG. 3B, unlike HEVC, in VVC, the CUS 302 can be rectangular or square, and can be coded without further partitioning into prediction units or transform units. Each CU 302 can be as large as its root CTU 300, or be subdivisions of a root CTU 300 as small as 4*4 blocks.

VVC adopts many new coding tools, and the details of these tools are specified in the following.

In this disclosure, coding is assumed to mean encoding and decoding methods and systems.

The CTUs in each picture are arranged in a regular grid. Then, in this disclosure, the CTUs are referred to by their position in the grid, such that $CTU_{i,j}$ indicates the CTU located at the $i^{th}$ CTU row and $j^{th}$ CTU column. In this disclosure, the CTU grid indexing starts from 0, so that for example the top left CTU of the picture is referred to as $CTU_{0,0}$. In the example of FIG. 3A, CTUs are decoded in a raster scan order through the picture. As each CTU is decoded, syntax elements are decoded from the bitstream by the CABAC arithmetic decoder, and contexts modelling the probability distribution of these syntax elements are correspondingly updated. The updated contexts are used for decoding the next CTU in the raster scan decoding order.

One advantage of this context updating policy is that the context modelling adapts and learns the statistics of the video signal progressively with each and every CTU that is decoded. However, it also imposes a sequential dependency in the raster scan decoding order. One consequence of this dependency is that all CABAC decoding must proceed sequentially, and the speed of the decoding process is effectively limited by the performance of a single decoder core. For video sequences with high data rate, for example, high resolution, high frame rate, the throughput requirements on the decoder are increased.

The picture may be split into independently decoded units such as slices or tiles. In such cases, parallel decoding of the individual slices/tiles with relatively low throughput decoders is possible. However, this comes at a significant compression penalty.

Wavefront Parallel Processing

VVC offers an alternative mechanism called wavefront parallel processing (WPP) to enable parallel decoding at a lower cost to compression efficiency.

When an SPS level syntax element sps_entropy_coding_sync_enabled_flag is enabled, the relationship between CTUs is modified in two ways.

Figure 4A:
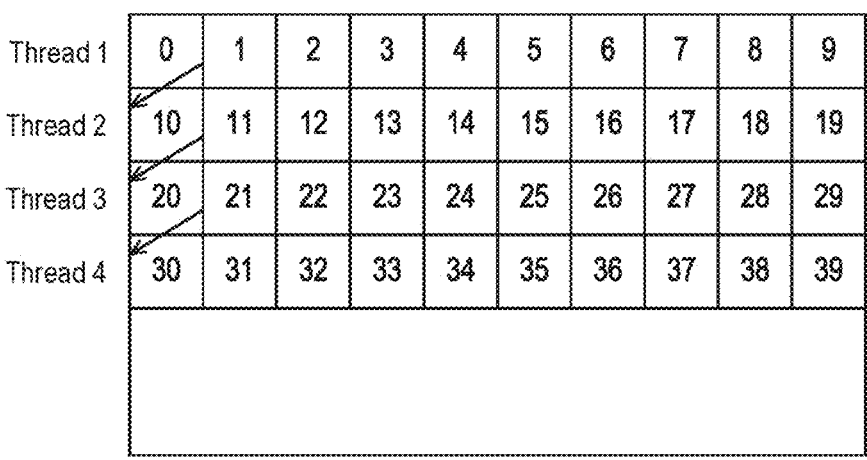
FIG. 4A is a schematic diagram illustrating CABAC and palette predictor propagation according to one embodiment of the disclosure.

FIG. 4A is a schematic diagram illustrating CABAC and palette predictor propagation according to one embodiment of the disclosure. As shown in FIG. 4A, firstly, the inheritance of state information between CTUs that would normally proceed in raster scan order is instead modified. At the start of each CTU row, rather than inheriting state information from the end of the previous CTU row, state information is inherited from the completion of the first CTU of the previous CTU row. The state information may consist of CABAC contexts as described above, as well as a palette predictor when the palette coding tool is enabled, but the disclosure is not limited thereto.

Secondly, neighbouring CTU availability for prediction is modified when the syntax element sps_entropy_coding_sync_c_enabled_flag is enabled. Ordinarily, a neighbouring CTU for a current $CTU_{i,j}$ is determined to be unavailable if any of the following is true:

a. The neighbouring CTU is outside the boundaries of the picture. For example, $CTU_{-1,0}$ cannot be available.

b. The neighbouring CTU is in a different slice or tile to the current $CTU_{i,j}$.

c. The neighbouring CTU is located after the current $CTU_{i,j}$ in the raster scan decoding order. For example, $CTU_{i,j+1}$ cannot be available.

When the syntax element sps_entropy_coding_sync_enabled_flag is enabled, the CTU availability for prediction is further restricted by another case. That is, a neighbouring $CTU_{a,b}$ is unavailable if its CTU column position is greater than the current CTU, i.e., if b>j.

The restrictions imposed by the syntax element sps_entropy_coding_sync_enabled_flag allow the bitstream to be decoded in a parallel structure called wavefront parallel processing (WPP).

Figure 4B:
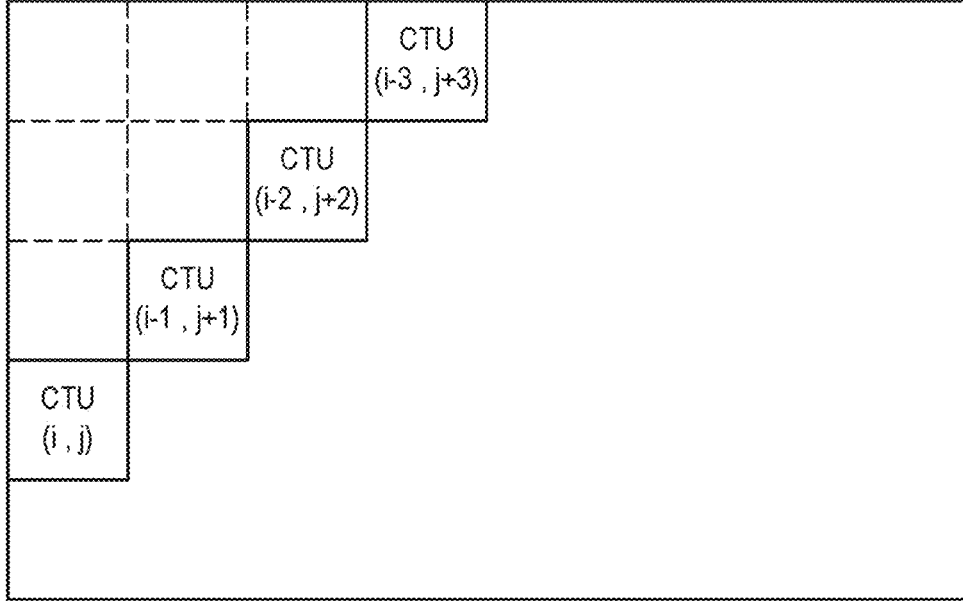
FIG. 4B is a schematic diagram illustrating a wavefront of WPP according to one embodiment of the disclosure.

FIG. 4B is a schematic diagram illustrating a wavefront of WPP according to one embodiment of the disclosure. As shown in FIG. 4B, a diagonally cascaded set of $CTU_{i,j}$, $CTU_{i-1,j+1}$, $CTU_{i-2,j+2}$ and $CTU_{i-3,j+3}$ can be decoded in parallel. Decoding of $CTU_{i,j}$ does not depend on $CTU_{i-1,j+1}$ as this neighbouring CTU is marked as unavailable for prediction, and state information such as CABAC contexts is inherited from $CTU_{i-1,j}$.

In the example of FIG. 4B, the maximum number of decoder cores that can process in parallel is min (X, Y) where X is the number of CTU columns in the picture, and Y is the number of CTU rows in the picture. Compared to slice or tile partitioning, WPP incurs less penalty to compression efficiency because prediction and state propagation is still permitted in a restricted manner across CTU rows.

Intra Block Copy

One of the intra prediction tools available in the VVC standard is intra block copy (IBC). When a CU is predicted by IBC, a corresponding block vector is used to determine the location of a predictor block. In VVC, the predictor block is obtained from a virtual IBC buffer with size 256*128 in luma samples. For a typical CTU size of 128*128 pixels, the virtual IBC buffer is two CTUs in size. This IBC buffer may also be referred to as the "reference area" or "search area", since an IBC-coded CU cannot be predicted from a block outside of the IBC buffer.

In an exploratory activity for enhanced compression beyond VVC, it has been proposed to extend the IBC reference area to the current CTU row, and the previous two CTU rows.

Figure 5A:
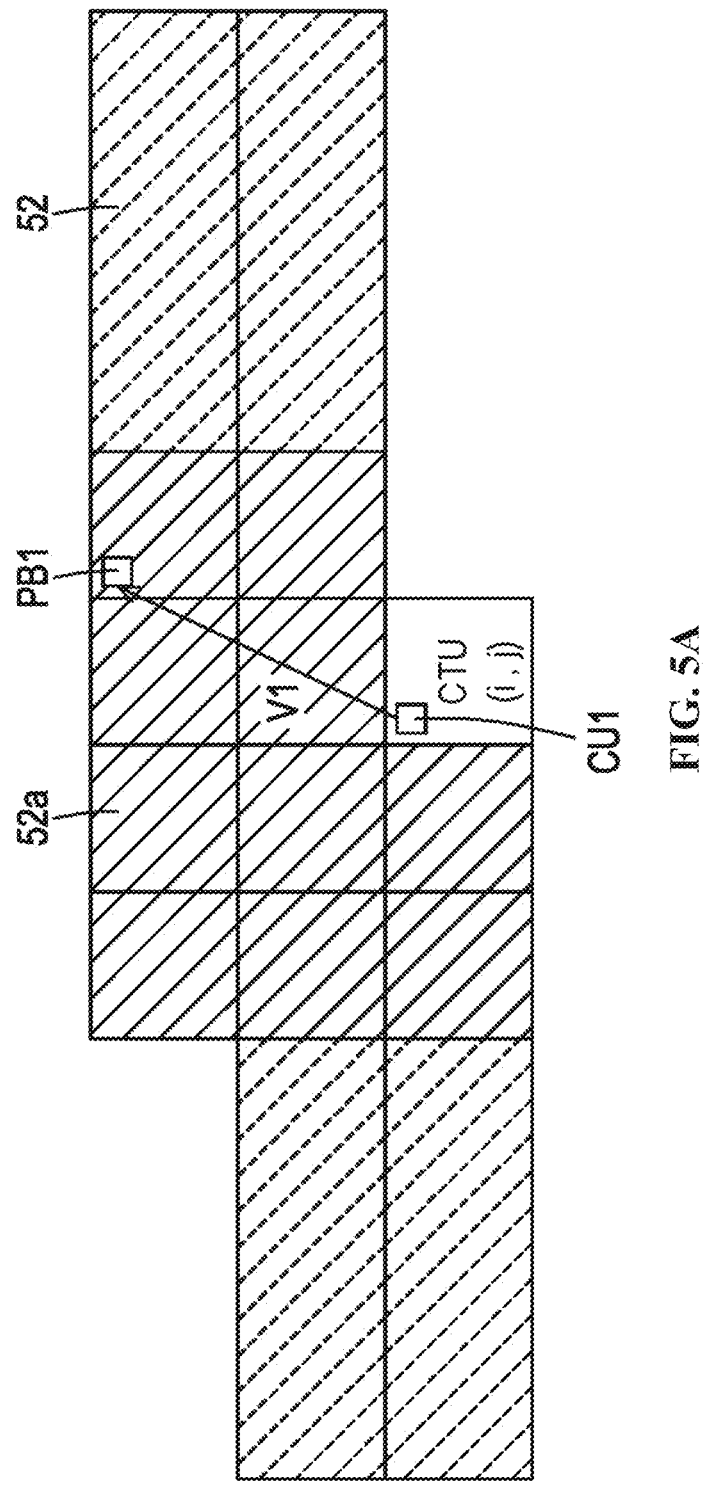
FIG. 5A is a schematic diagram illustrating expanded IBC reference area according to one embodiment of the disclosure.

FIG. 5A is a schematic diagram illustrating expanded IBC reference area according to one embodiment of the disclosure. As shown in FIG. 5A, the expanded reference area 52 is shown by the shaded regions. That is, if a block CU1 in a current $CTU_{i,j}$ is predicted by IBC, then it may reference any $CTU_{i-2,k}$ from two CTU rows above for k≥j−2, any $CTU_{i-1,k}$ from one CTU row above, and any $CTU_{i,k}$ from the current CTU row for k≤j−1. In the present embodiment, the prediction block PB1 in $CTU_{i-2,j+1}$ is used as a predictor for decoding the block CU1.

While any block in the expanded IBC reference area can be referenced by an IBC block vector, determining the block vector at the encoder by an exhaustive search is impractical. For example, in the enhanced compression software model (ECM), the encoder only performs a full per-sample search in the "local search area 52a" indicated by the solid hatched CTUs. The local search area 52a consists of any $CTU_{i-2,k}$ from two CTU rows above for (j−2)≤k≤(j+1), any $CTU_{i-1,k}$ from one CTU row above for (j−2)≤k≤(j+1), and any $CTU_{i,k}$ for (j−2)≤k≤(j−1). Equivalently, the local search area 52a is composed of $CTU_{i-2,j-2}$, $CTU_{i-2,j-1}$, $CTU_{i-2,j}$, $CTU_{i-2,j+1}$, $CTU_{i-1,j-2}$, $CTU_{i-1,j-1}$, $CTU_{i-1,j}$, $CTU_{i-1,j+1}$, $CTU_{i,j-2}$ and $CTU_{i,j-1}$.

To limit the memory buffering burden, it was proposed as a special case to only extend the IBC reference area to the current CTU row and the previous CTU row when the CTU size is 256*256 pixels.

Figure 5B:
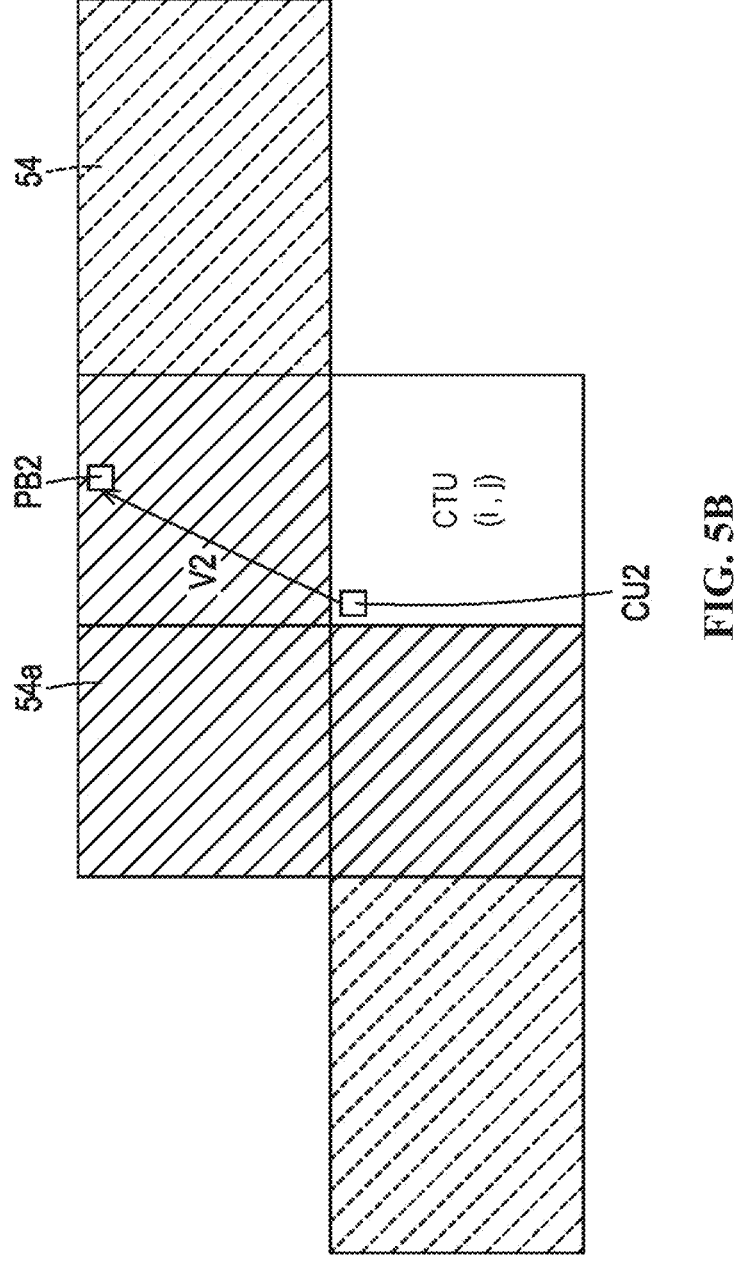
FIG. 5B is a schematic diagram illustrating expanded IBC reference area according to one embodiment of the disclosure.

FIG. 5B is a schematic diagram illustrating expanded IBC reference area according to one embodiment of the disclosure. As shown in FIG. 5B, the expanded reference area 54 is shown by the shaded regions. That is, if a block in a current $CTU_{i,j}$ is predicted by IBC, then it may reference any $CTU_{i-1,k}$ from one CTU row above for k≥j−1, and any $CTU_{i,k}$ from the current CTU row for k≤j−1. In the present embodiment, the prediction block PB2 in $CTU_{i-1,j+1}$ is used as a predictor for decoding the block CU2.

Similar to the general case described above with reference to FIG. 5A, the ECM encoder performs full search for IBC block vectors only over a local search area 54a indicated by the solid hatched CTUs in FIG. 5B. That is, when the CTU size is 256*256, the local search area 54a is composed of $CTU_{i-1,j-1}$, $CTU_{i-1,j}$ and $CTU_{i,j-1}$.

[Decoder]

Figure 6:
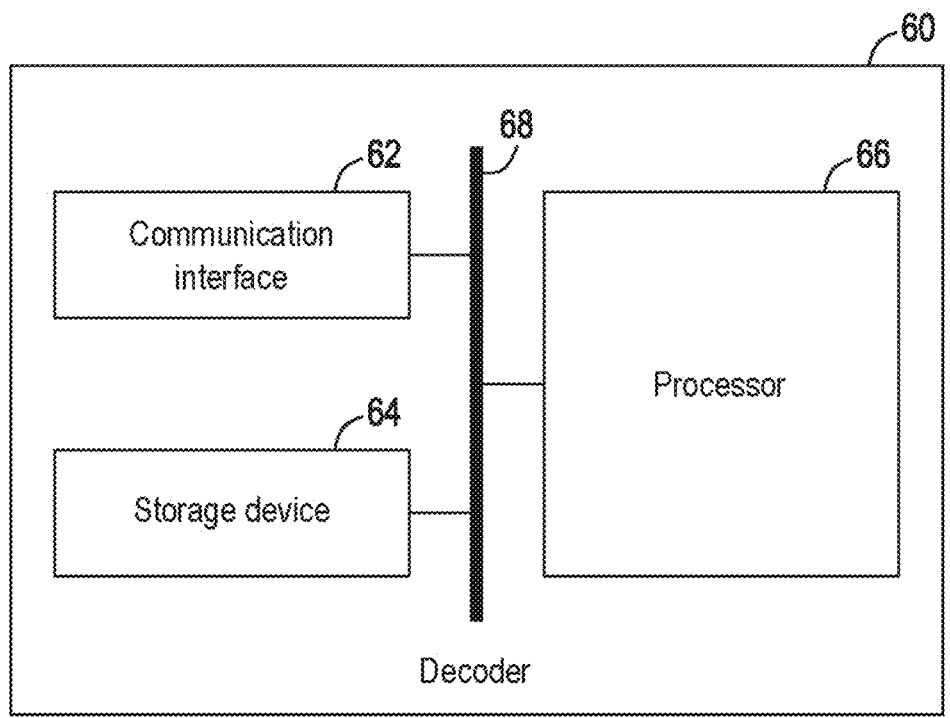
FIG. 6 is a schematic diagram of the hardware structure of a decoder provided by an embodiment of the application according to one embodiment of the disclosure.

FIG. 6 is a schematic diagram of the hardware structure of a decoder provided by an embodiment of the application according to one embodiment of the disclosure. Referring to FIG. 6, a decoder 60 includes a communication interface 62, a storage device 64, and a processor 66 coupled to the communication interface 62 and the storage device 64 through a bus system 68.

The communication interface 62 is, for example, a network card that supports wired network connections such as Ethernet, a wireless network card that supports wireless communication standards such as Institute of Electrical and Electronics Engineers (IEEE) 802.11n/b/g/ac/ax/be, or any other network connecting device, but the embodiment is not limited thereto. The communication interface 62 is configured to retrieve a bitstream corresponding to a current frame.

The storage device 64 may be a volatile memory or a non-volatile memory, or may include both volatile and non-volatile memory. Among them, the non-volatile memory can be read-only memory (Read-Only Memory, ROM), programmable read-only memory (Programmable ROM, PROM), erasable programmable read-only memory (Erasable PROM, EPROM), and electrically available Erase programmable read-only memory (Electrically EPROM, EEPROM) or flash memory. The volatile memory may be random access memory (Random Access Memory, RAM), which is used as an external cache. The storage device 64 described in this application is configured to store at least one computer executable instruction.

The processor 66 is coupled to the communication interface 62 and the storage device 64 through a bus system 68. It can be understood that the bus system 68 is used as a data bus to implement connection and communication between these components. In addition to the data bus, the bus system 68 may also be a power bus, a control bus, a status signal bus or a combination thereof, but the embodiment is not limited thereto.

It is understandable that, the various components in this embodiment may be integrated into one processing unit, or each component may exist alone physically, or two or more components may be integrated into one component.

FIG. 7 is a flowchart of a coding method applied to a decoder according to one embodiment of the disclosure. With reference to FIG. 6 and FIG. 7 together, the method of this embodiment is applied to the decoder 60 in FIG. 6. Detailed steps of the coding method of exemplary embodiments of the disclosure accompanied with the elements in the decoder 60 will now be described below.

In step S702, the processor 66 retrieves a bitstream corresponding to a current frame by using the communication interface 62.

In step S704, the processor 66 parses the bitstream to obtain a current coding tree unit (CTU) of the current frame.

In step S706, the processor 66 determines an availability of at least one neighbouring CTU of the current CTU in the current frame according to a wavefront delay, wherein the wavefront delay is a delay in units of CTUs in a row direction between the current CTU at a current CTU row and the neighbouring CTU at a previous CTU row which are decoded in parallel.

In some embodiments, in decoding a first CTU of the current CTU row, the processor 66 may inherit state information at the latest from a completion of a neighbouring CTU at the previous CTU row with a delay of N−1 CTUs in the row direction when the wavefront delay is N CTUs such that the wavefront parallel processing (WPP) can be implemented. Examples of the state information include CABAC contexts, palette predictors, and persistent Rice parameters, but the disclosure is not limited thereto.

It is noted, in the disclosure, a first aspect of the disclosure is proposed with a generalised implementation of the WPP feature. Let a wavefront delay be defined as N, where N is the delay in units of CTUs between the decoding "wavefront" at CTU row i and the decoding wavefront at the next CTU row i+1. Then, when a high level syntax element such as sps_entropy_coding_sync_enabled_flag is enabled, the video coding and resulting bitstream are modified in two ways:

a. At the start of each CTU row i, rather than inheriting state information from the last CTU of the previous CTU row, state information is inherited at the latest from the completion of $CTU_{i-1,N-1}$ of the previous CTU row.

b. Neighbouring CTU availability for prediction is restricted by an additional case. That is, a neighbouring $CTU_{a,b}$ is marked unavailable as a predictor for the current $CTU_{i,j}$ if b−j≥(i−a)*N.

Figure 8:
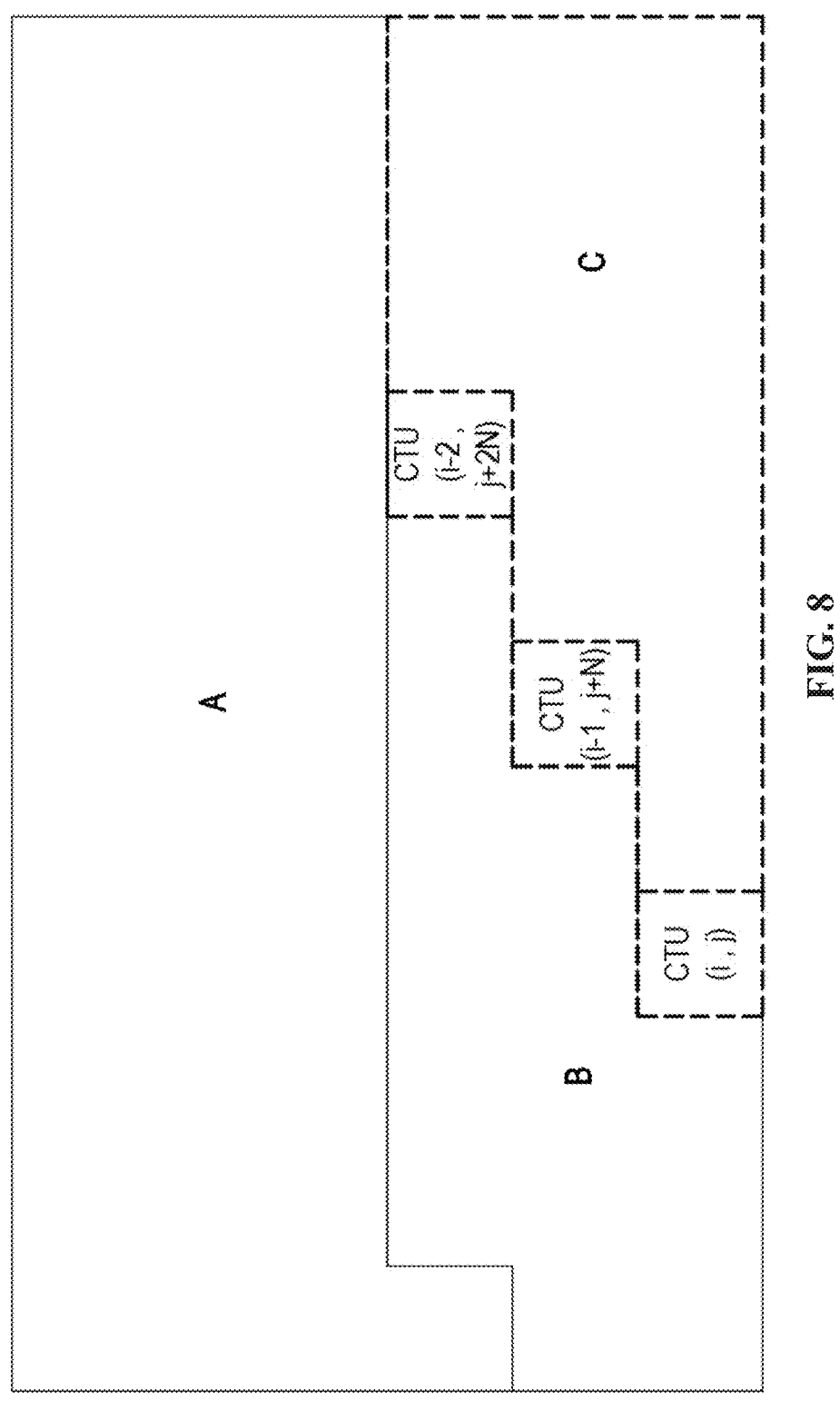
FIG. 8 is a schematic diagram illustrating neighbouring block availability according to a wavefront delay according to one embodiment of the disclosure.

FIG. 8 is a schematic diagram illustrating neighbouring block availability according to a wavefront delay according to one embodiment of the disclosure. Referring to FIG. 8, as a wavefront delay is defined as N, the available area is bordered by solid lines (including area A and area B in which area B is the IBC reference area) and the unavailable area is bordered by dashed lines (i.e. area C).

It is noted, when N=1, then the above restrictions permit the WPP feature of VVC. The CTU availability restriction (unavailable when b−j≥i−a) is less restrictive than VVC (unavailable when b>j), but still permits implementation of the WPP feature. Setting the wavefront delay N to a different value allows a trade-off between compression efficiency and parallelisation. With a higher value of N, compression efficiency is improved both because the state information is allowed to adapt to more CTUs before propagating to the next CTU row, and because a larger area in the picture is marked as available for prediction. However, a higher value of N also decreases the number of parallel decoder cores that can be used to decode the picture. If X is the number of CTU columns in the picture, and Y is the number of CTU rows in the picture, then the maximum number of decoder cores that can process in parallel is $$\min\left(\frac{X}{N}, Y\right).$$

Returning to the flow of FIG. 7, in step S708, the processor 66 determines a prediction block in the at least one neighbouring CTU for a current coding unit (CU) in the current CTU.

Finally, in step S710, the processor 66 decodes the current CU using the prediction block.

Based on the above, the disclosure provides modification to wavefront parallel processing (WPP) with restrictions to the neighbouring CTUs used for prediction, such that the bitstream can be decoded by multiple low-cost decoder cores and decoding throughput can be improved.

In a second aspect of the disclosure, when the syntax element sps_entropy_coding_sync_enabled_flag is enabled, intra predictions tools are restricted to conform with an area available for prediction which is required to permit WPP. When combined with the first aspect, the IBC reference area for a $CTU_{i,j}$ is modified to the intersection of the expanded reference area described in FIG. 5A and the area available to $CTU_{i,j}$ as shown in FIG. 8, resulting in an IBC reference area B as shown in FIG. 8. More generally, when the syntax element sps_entropy_coding_sync_enabled_flag is enabled, any intra prediction tool is restricted to the area available for prediction. For example, the IBC reference area could be further extended to more CTU rows, or modified in shape, but must still be masked to the intersection with the area available for prediction.

For example, if the wavefront delay N=1, then the IBC reference area for a block in a current $CTU_{i,j}$ is modified to any $CTU_{i-2,k}$ from two CTU rows above for j−2≤k<j+2, any $CTU_{i-1,k}$ from one CTU row above for k<j+1, and any $CTU_{i,k}$ from the current CTU row for k<j. If the wavefront delay N=3, then the IBC reference area for a block in a current $CTU_{i,j}$ is modified to any $CTU_{i-2,k}$ from two CTU rows above the $i^{th}$ CTU row for j−2≤k<j+6, any $CTU_{i-1,k}$ from one CTU row above the it CTU row for k<j+4, and any $CTU_{i,k}$ for k<j.

Figure 9:
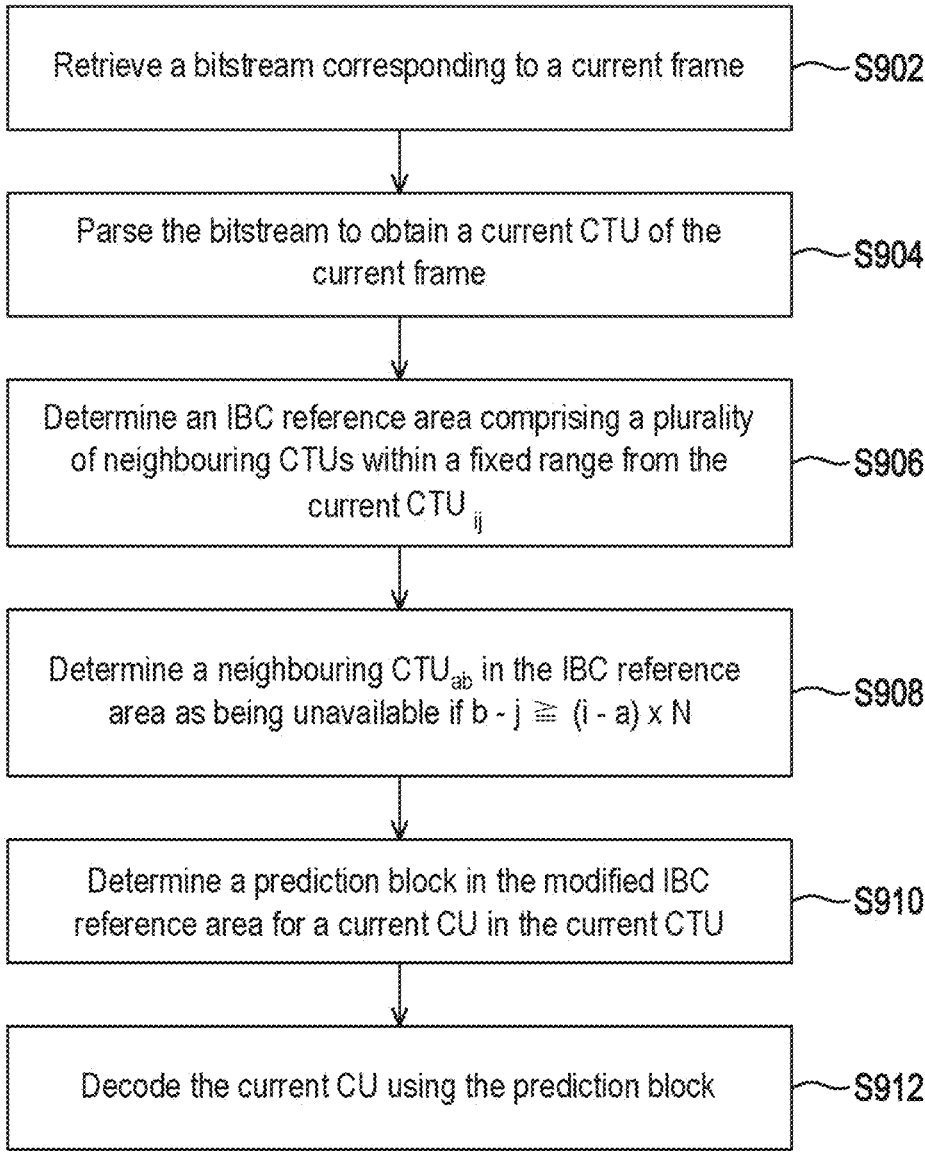
FIG. 9 is a flowchart of a coding method applied to a decoder according to one embodiment of the disclosure.

FIG. 9 is a flowchart of a coding method applied to a decoder according to one embodiment of the disclosure. With reference to FIG. 6 and FIG. 9 together, the method of this embodiment is applied to the decoder 60 in FIG. 6. Detailed steps of the coding method of exemplary embodiments of the disclosure accompanied with the elements in the decoder 60 will now be described below.

In step S902, the processor 66 retrieves a bitstream corresponding to a current frame by using the communication interface 62.

In step S904, the processor 66 parses the bitstream to obtain a current coding tree unit (CTU) of the current frame.

In step S906, the processor 66 determines an IBC reference area comprising a plurality of neighbouring CTUs within a fixed range from the current $CTU_{i,j}$. For example, the local search area in FIG. 5 is determined as the IBC reference area.

In step S908, the processor 66 determines a neighbouring $CTU_{a,\ b}$ at $a^{th}$ CTU row and $b^{th}$ CTU column in the IBC reference area as being unavailable if $b-j \geq (i-a) \times N$ when the wavefront delay is N CTUs. In some embodiments, the IBC reference area is modified by removing the CTUs determined to be unavailable. For example, the area B in FIG. 8 is determined as the modified IBC reference area.

In step S910, the processor 66 determines a prediction block in the modified IBC reference area for a current coding unit (CU) in the current CTU.

Finally, in step S912, the processor 66 decodes the current CU using the prediction block.

Based on the above, the disclosure provides modifications to the IBC reference area and the WPP, so as to allow compatibility between IBC and WPP while still expanding the IBC reference area to allow improved intra prediction.

For the special case when the CTU size is 256*256 pixels, the IBC reference area is modified to the intersection of the expanded reference area described in FIG. 5B and the area available for prediction as shown in FIG. 8. For example, if the wavefront delay N=1, then the IBC reference area for a block in a current $CTU_{i,j}$ is modified to any $CTU_{i-1,k}$ from one CTU row above for $j-1 \leq k < j+1$, and any $CTU_{i,k}$ from the current CTU row for $k < j$.

In some embodiments, the second aspect is combined with the restrictions imposed by the syntax element sps_entropy_coding_sync_enabled_flag in VVC. This results in the IBC reference area for the $CTU_{i,j}$.

Figure 10:
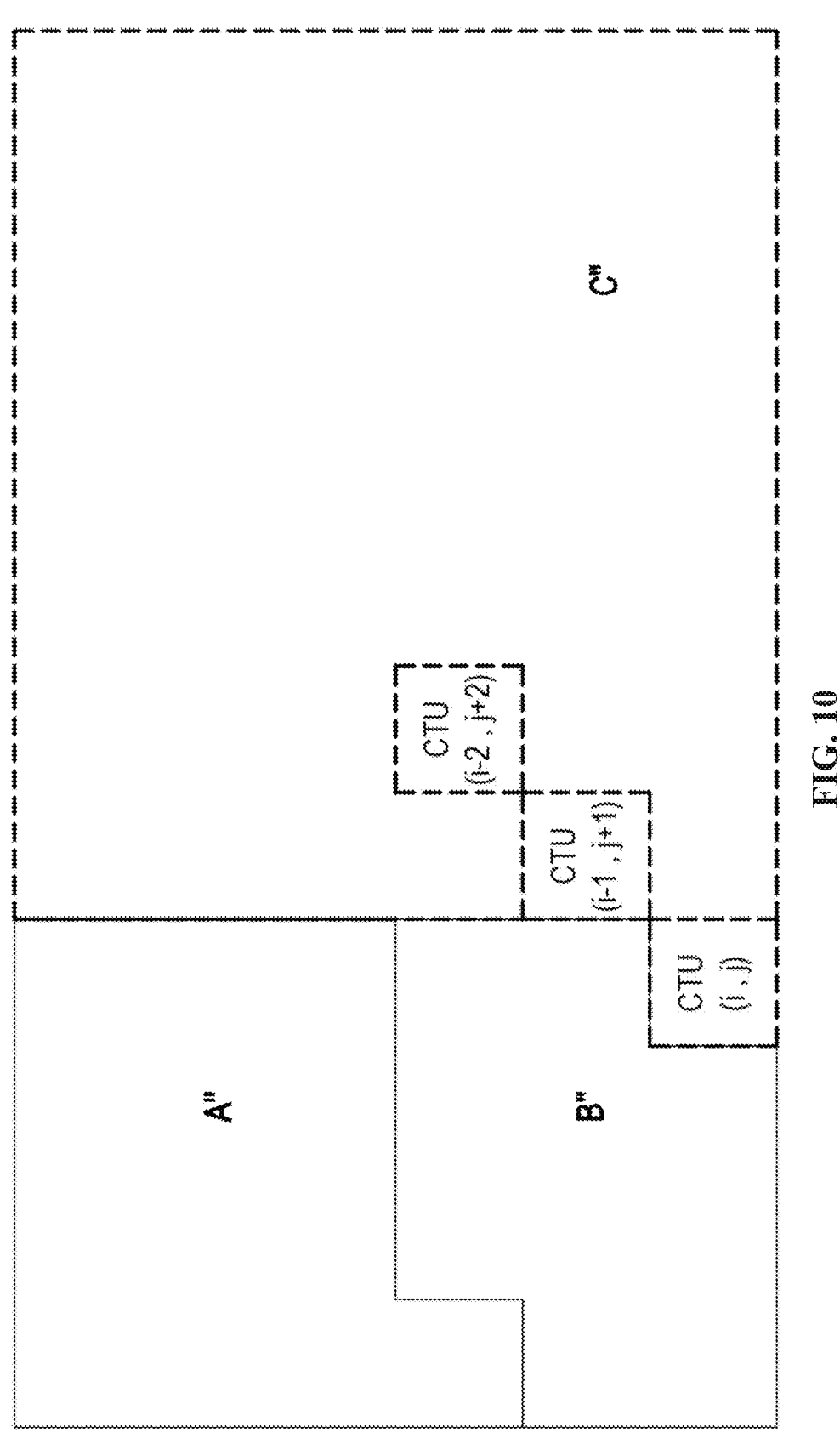
FIG. 10 is a schematic diagram illustrating neighbouring block availability according to a wavefront delay according to one embodiment of the disclosure.

In another embodiment, step S908 is modified such that the unavailability rule is unchanged from the VVC standard. That is, a neighbouring $CTU_{a,\ b}$ at $a^{th}$ CTU row and $b^{th}$ CTU column is unavailable if $b > j$. FIG. 10 is a schematic diagram illustrating neighbouring block availability according to this embodiment of the disclosure. Referring to FIG. 10, if the wavefront delay N=1, then the IBC reference area for a block in a current $CTU_{i,j}$ is modified to any $CTU_{i-2,k}$ from two CTU rows above for $j-2 \leq k \leq j$, any $CTU_{i-1,k}$ from one CTU row above for $k \leq j$, and any $CTU_{i,k}$ from the current CTU row for $k < j$. The IBC reference area is smaller than in the arrangement as shown in FIG. 8, which may result in lower compression performance. However, it may be desirable for ease of implementation and buffer management to use a regular shaped IBC reference area as in FIG. 10.

In some embodiments, the IBC reference area when the syntax element sps_entropy_coding_sync_enabled_flag is disabled may firstly be reduced to the local search area described above with reference to FIG. 5A and FIG. 5B. Reducing the IBC reference area may result in lower compression performance for the IBC tool generally. However, there are several reasons why this arrangement may be desirable.

Firstly, the reduction in compression performance may be small, since the local search area consists of spatially close CTUs, and these are likely to provide the best predictors for the current block. Secondly, the local search area has a fixed size in units of CTUs and so the IBC buffer requirements are only dependent on the CTU size. This may be more desirable for profile design and hardware implementation than an IBC reference area which is both dependent on the CTU size and the CTU row width. Thirdly, when the syntax element sps_entropy_coding_sync_enabled_flag is enabled, the WPP feature can be preserved without needing to further restrict the IBC reference area. For example, if the first aspect is implemented with delay N=2, then no further restriction in the IBC reference area is required. If the first aspect is implemented with delay N=1 then when the syntax element sps_entropy_coding_sync_enabled_flag is enabled, the IBC reference area is still modified to its intersection with the area available for prediction.

Figure 11:
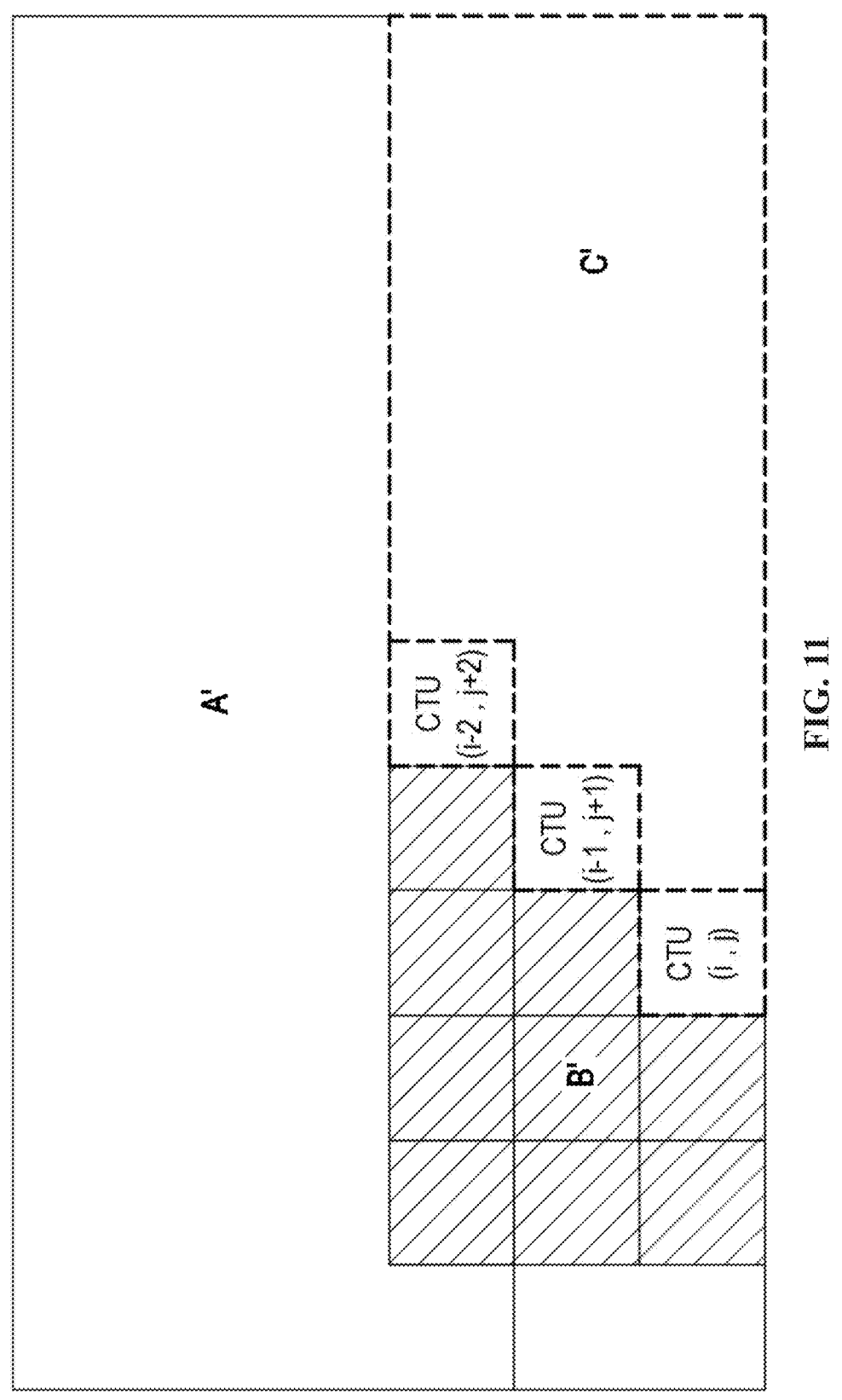
FIG. 11 is a schematic diagram illustrating neighbouring block availability according to a wavefront delay according to one embodiment of the disclosure.

FIG. 11 is a schematic diagram illustrating the embodiment where the original IBC reference area is reduced to the local search area 52a described in FIG. 5A. When the syntax element sps_entropy_coding_sync_enabled_flag is disabled, then the IBC reference area is set equal to the local search area 52a, which is composed of $CTU_{i-2,j-2}$, $CTU_{i-2,j-1}$, $CTU_{i-2,j}$, $CTU_{i-2,j+1}$, $CTU_{i-1,j-2}$, $CTU_{i-1,j-1}$, $CTU_{i-1,j}$, $CTU_{i-1,j+1}$, $CTU_{i,j-2}$ and $CTU_{i,j-1}$. When the syntax element sps_entropy_coding_sync_enabled_flag is enabled with a wavefront delay of N=1, then the neighbouring CTU availability for prediction is restricted by the unavailable area bordered by dashed lines (i.e. area C') and the available area bordered by solid lines (i.e. area A'). The IBC reference area is modified to the area B' comprising the neighbouring CTUs $CTU_{i-2,j-2}$, $CTU_{i-2,j-1}$, $CTU_{i-2,j}$, $CTU_{i-2,j+1}$, $CTU_{i-1,j-2}$, $CTU_{i-1,j-1}$, $CTU_{i-1,j}$, $CTU_{i,j-2}$ and $CTU_{i,j-1}$.

In some embodiments of the second aspect, the reference area of the IBC tool may be reduced to conform with the area available for prediction when the syntax element sps_entropy_coding_sync_enabled_flag is enabled, regardless of the value of the syntax element sps_entropy_coding_sync_enabled_flag. For example, the reduced IBC reference area of FIG. 8 or FIG. 10 may be used for the IBC tool always. While this reduces the potential compression efficiency of the IBC tool, this restriction may be more desirable for encoder implementation. Change in the reference area when the syntax element sps_entropy_coding_sync_enabled_flag is enabled or disabled implies that, to maximise coding gain, an encoder would need to implement two separate IBC search algorithms. In practice, it may be more desirable to optimise a single search algorithm for the reduced IBC reference area.

In a third aspect of the disclosure, the binarisation of IBC block vectors signalled in the bitstream is not restricted to conform with the IBC reference area described in the second aspect, but values which would result in a block vector pointing outside of the IBC reference area are illegal. For example, the binarisation for IBC block vectors may be within an unbounded codeword space, or a bounded codeword space with a maximum value beyond the range of the IBC reference area. Codewords with values that would result in an IBC vector pointing outside of the IBC reference area are not legal in the bitstream.

In some embodiments, values signalled in the bitstream may be passed into a mapping function to determine the IBC block vector, where the function can only produce block vectors pointing inside the IBC reference area. For example, the function may clip the codeword values, or apply modulo operations to enforce the legality of the block vector.

In some embodiments, IBC block vectors may be binarised to a bounded codeword space that does not permit signalling a block vector that points outside of the IBC reference area.

Figure 12:
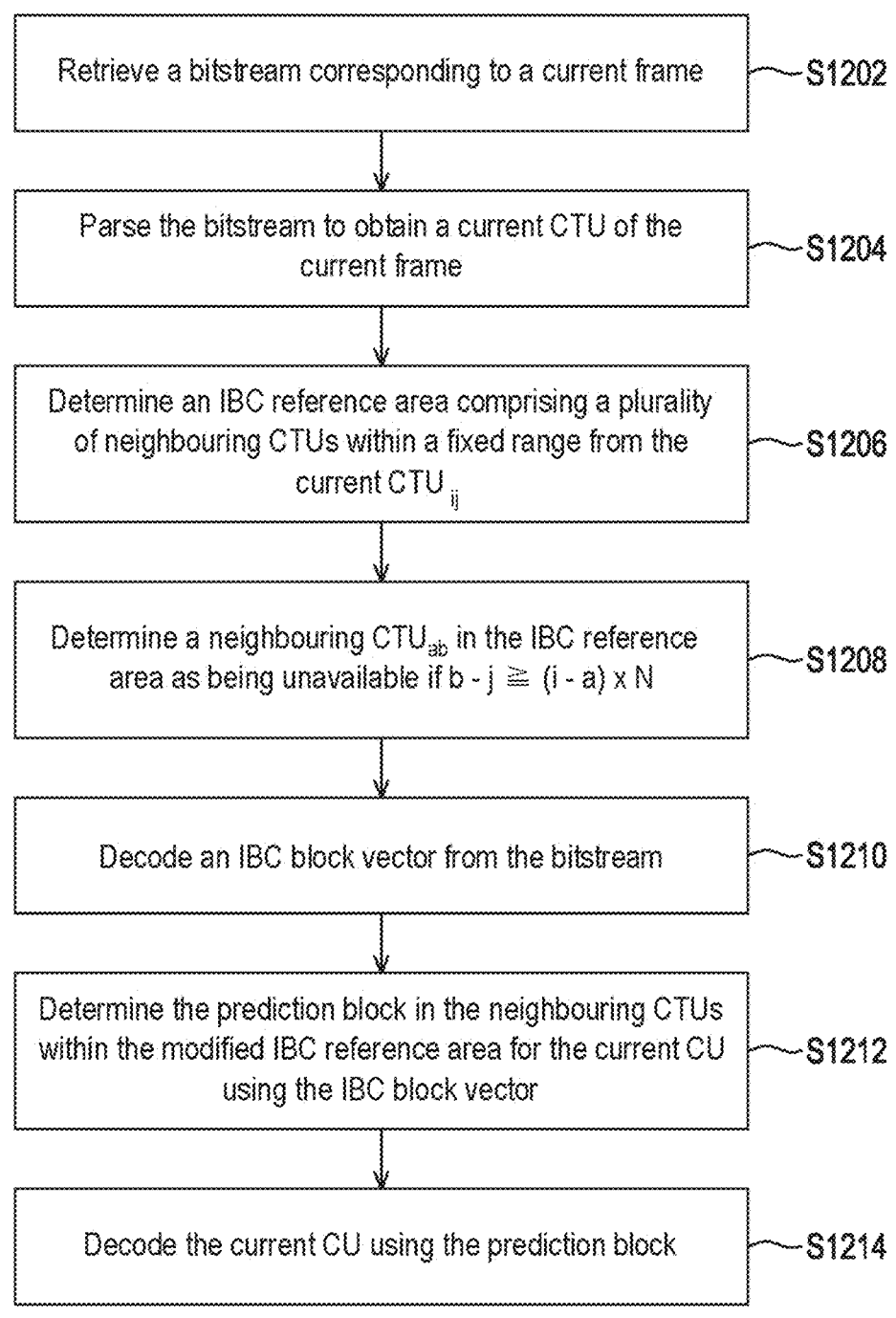
FIG. 12 is a flowchart of a coding method applied to a decoder according to one embodiment of the disclosure.

FIG. 12 is a flowchart of a coding method applied to a decoder according to one embodiment of the disclosure. With reference to FIG. 6 and FIG. 12 together, the method of this embodiment is applied to the decoder 60 in FIG. 6. Detailed steps of the coding method of exemplary embodiments of the disclosure accompanied with the elements in the decoder 60 will now be described below.

In step S1202, the processor 66 retrieves a bitstream corresponding to a current frame by using the communication interface 62.

In step S1204, the processor 66 parses the bitstream to obtain a current coding tree unit (CTU) of the current frame.

In step S1206, the processor 66 determines an IBC reference area comprising a plurality of neighbouring CTUs within a fixed range from the current $CTU_{i,j}$.

In step S1208, the processor 66 determines a neighbouring $CTU_{a,b}$ at $a^{th}$ CTU row and $b^{th}$ CTU column in the IBC reference area as being unavailable if $b-j \geq (i-a) \times N$ when the wavefront delay is N CTUs.

Instead of determining the prediction block using samples in the modified IBC reference area, in step S1210 of the present embodiment, the processor 66 decodes an IBC block vector from the bitstream.

In step S1212, the processor 66 determines the prediction block in the neighbouring CTUs within the IBC reference area for the current CU using the IBC block vector.

In some embodiments, the IBC block vector is determined as illegal if the IBC block vector points to an area outside the IBC reference area. For example, if the horizontal component of the IBC block vector is signaled as 3 bits, and values 0 to 5 would point to an area inside the IBC reference area, but values 6 and 7 would point to an area outside of the IBC reference area. Then binarised IBC block vector horizontal components {110, 111} with values of 6 and 7 are determined as illegal.

In some embodiments, the IBC block vector is modified to point to an area inside the IBC reference area by a mapping function. For example, assuming the horizontal component of the IBC block vector is signaled as 3 bits, the decoded value may be clipped to max (x, 5), such that the binarised horizontal components {000, 001, 010, 011, 100, 101} keep original values while the binarised horizontal components {110, 111} are clipped to a value of 5. In another example, assuming the horizontal component of the IBC block vector is signaled as 3 bits, a modulus operator may be applied x % 6, such that the binarised horizontal components {000, 001, 010, 011, 100, 101} keep original values while the binarised horizontal component {110} is changed to a value of 0 and the binarised horizontal component {110} is changed to a value of 1.

In some embodiments, the IBC block vector is binarised to a codeword space that is bounded within limits of the IBC reference area. For example, assuming the horizontal component of the IBC block vector may take a value between 0 and 5, but values or 6 or 7 would point to an area outside of the IBC reference area. Truncated binary codewords such as {000=0, 001=1, 010=2, 011=3, 10=4, 11=5} are used to create a codeword space limited to the allowed values of the horizontal component.

[Encoder]

Figure 13:
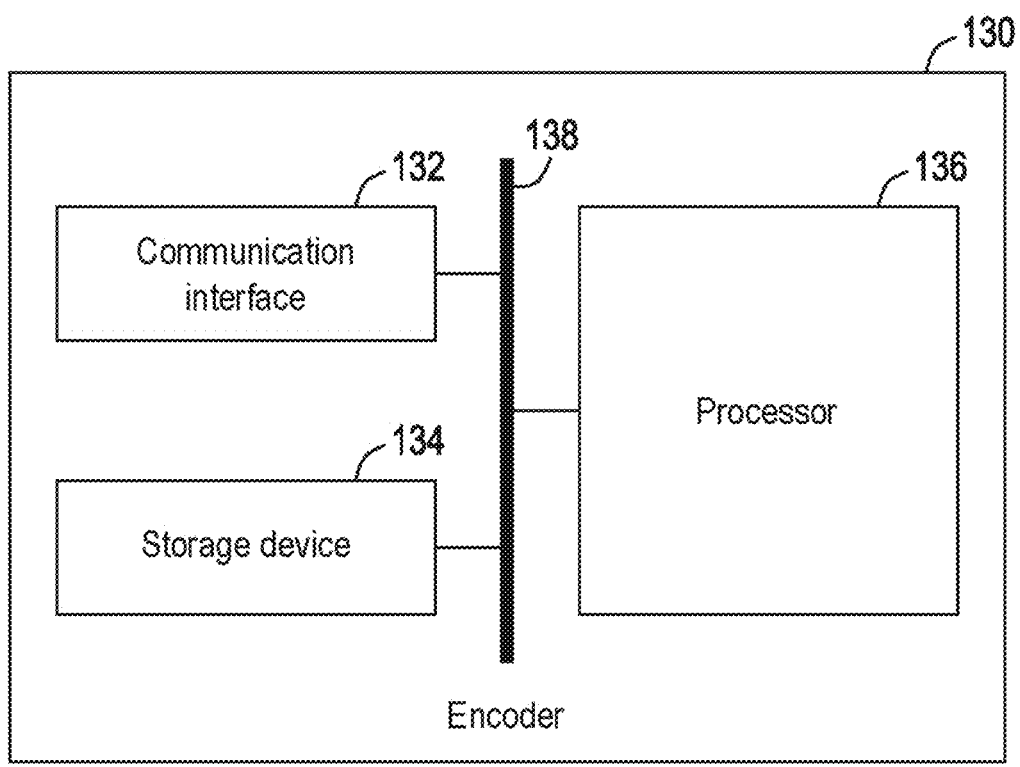
FIG. 13 is a schematic diagram of the hardware structure of an encoder according to one embodiment of the disclosure.

FIG. 13 is a schematic diagram of the hardware structure of an encoder according to one embodiment of the disclosure. Referring to FIG. 13, an encoder 130 includes a communication interface 132, a storage device 134, and a processor 136 coupled to the communication interface 132 and the storage device 134 through a bus system 138.

It can be understood that the hardware structures of the communication interface 132, the storage device 134, the processor 136, and the bus system 138 are similar to those of the communication interface 62, the storage device 64, the processor 66, and the bus system 68 in FIG. 6, and therefore the details are not described herein again.

In the present embodiment, the communication interface 132 is configured to retrieve a current frame of a video, and the processor 136 is configured to execute the computer executable instructions stored in the storage device 134 to perform the video coding method below.

FIG. 14 is a flowchart of a video coding method applied to a decoder according to one embodiment of the disclosure. With reference to FIG. 13 and FIG. 14 together, the method of this embodiment is applied to the encoder 130 in FIG. 13. Detailed steps of the video coding method of exemplary embodiments of the disclosure accompanied with the elements in the encoder 120 will now be described below.

In step S1402, the processor 136 retrieves a current frame of a video by using the communication interface 132.

In step S1404, the processor 136 divides the current frame into a plurality of CTUs.

In step S1406, the processor 136 determines an availability of at least one neighbouring CTU of a current CTU in the current frame according to a wavefront delay. The wavefront delay is a delay in units of CTUs in a row direction between the current CTU at a current CTU row and the neighbouring CTU at a previous CTU row which are coded in parallel.

In step S1408, the processor 136 performs an intra prediction on a current CU of the current CTU to obtain a prediction block from the at least one neighbouring CTU.

In step S1410, the processor 136 encodes a block vector pointing to the prediction block into a bitstream corresponding to the current frame.

To sum up, in the video coding method, the encoder, and the decoder of the disclosure, modifications are described which permit intra prediction with extended reference area, in particular IBC prediction, to remain compatible with the WPP feature. As a result, a bitstream supporting the IBC coding tool can be decoded by multiple low-cost decoder cores and decoding throughput can be improved.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A video coding method, applied to a decoder, comprising:

retrieving a bitstream corresponding to a current frame and parsing the bitstream to obtain a current coding tree unit (CTU) of the current frame;

determining an availability of at least one neighbouring CTU of the current CTU in the current frame according to a wavefront delay, wherein the wavefront delay is a delay in units of CTUs in a row direction between the current CTU at a current CTU row and the neighbouring CTU at a previous CTU row which are decoded in parallel;

determining a prediction block in the at least one neighbouring CTU for a current coding unit (CU) in the current CTU; and decoding the current CU using the prediction block.

2. The method according to claim 1, further comprising:

in decoding a first CTU of the current CTU row, inheriting state information at the latest from a completion of a neighbouring CTU at the previous CTU row with a delay of N-1 CTUs in the row direction when the wavefront delay is N CTUs.

3. The method according to claim 1, wherein the step of determining an availability of at least one neighbouring CTU of the current CTU in the current frame according to a wavefront delay comprises:

for a current $CTU_{i,j}$ at $i^{th}$ CTU row and $j^{th}$ CTU column, determining a neighbouring $CTU_{a, b}$ at $a^{th}$ CTU row and $b^{th}$ CTU column as being unavailable if $b−j≥(i−a)×N$ when the wavefront delay is N CTUs.

4. The method according to claim 1, wherein the availability of at least one neighbouring CTU of the current CTU in the current frame is determined according to the wavefront delay in response to a sequence parameter set (SPS) level syntax element being enabled.

5. The method according to claim 1, wherein the step of determining an availability of at least one neighbouring CTU of the current CTU in the current frame according to a wavefront delay comprises:

for a current $CTU_{i,j}$ at $i^{th}$ CTU row and $j^{th}$ CTU column, determining an intra block copy (IBC) reference area comprising a plurality of neighbouring CTUs within a fixed range from the current $CTU_{i,j}$, and determining a neighbouring $CTU_{a, b}$ at $a^{th}$ CTU row and $b^{th}$ CTU column in the IBC reference area as being unavailable if $b−j≥(i−a)×N$ when the wavefront delay is N CTUs.

6. The method according to claim 5, wherein the IBC reference area comprises a neighbouring $CTU_{i−2,k}$ from two CTU rows above the $i^{th}$ CTU row for $(j−2)≤k≤(j+1)$, a neighbouring $CTU_{i−1,k}$ from one CTU row above the $i^{th}$ CTU row for $(j−2)≤k≤(j+1)$, and a neighbouring $CTU_{i,k}$ for $(j−2)≤k≤(j−1)$.

7. The method according to claim 5, wherein the IBC reference area comprises a neighbouring $CTU_{i−1,k}$ from one CTU row above the $i^{th}$ CTU row for $(j−1)≤k$, and a neighbouring $CTU_{i,k}$ for $k<j$.

8. The method according to claim 5, wherein the IBC reference area comprises a neighbouring $CTU_{i−2,k}$ from two CTU rows above the $i^{th}$ CTU row for $(j−2)≤k$, a neighbouring $CTU_{i−1,k}$ from one CTU row above the $i^{th}$ CTU row for any k, and a neighbouring $CTU_{i,k}$ for $k<j$.

9. The method according to claim 5, wherein the step of determining a prediction block in the at least one neighbouring CTU for a current CU in the current CTU comprises:

decoding an IBC block vector from the bitstream; and determining the prediction block in the at least one neighbouring CTU within the IBC reference area for the current CU using the IBC block vector, wherein the IBC block vector is determined as illegal if the IBC block vector points to an area outside the IBC reference area, or modified to point to an area inside the IBC reference area by a mapping function, or binarised to a codeword space that is bounded within limits of the IBC reference area.

10. A decoder, comprising:

a communication interface, configured to retrieve a bitstream corresponding to a current frame;
a storage device, configured to store at least one computer executable instruction; and
a processor, coupled to the communication interface and the storage device, and configured to execute the at least one computer executable instruction to:
parse the bitstream to obtain a current coding tree unit (CTU) of the current frame;
determine an availability of at least one neighbouring CTU of the current CTU in the current frame according to a wavefront delay, wherein the wavefront delay is a delay in units of CTUs in a row direction between the current CTU at a current CTU row and the neighbouring CTU at a previous CTU row which are decoded in parallel;
determine a prediction block in the at least one neighbouring CTU for a current coding unit (CU) in the current CTU; and
decode the current CU using the prediction block.

11. The decoder according to claim 10, wherein the processor is configured to inherit state information at the latest from a completion of a neighbouring CTU at the previous CTU row with a delay of N−1 CTUs in the row direction when the wavefront delay is N CTUs in decoding a first CTU of the current CTU row.

12. The decoder according to claim 10, wherein for a current $CTU_{i,j}$ at $i^{th}$ CTU row and $j^{th}$ CTU column, the processor is configured to determine a neighbouring $CTU_{a, b}$ at $a^{th}$ CTU row and $b^{th}$ CTU column as being unavailable if $b−j≥(i−a)×N$ when the wavefront delay is N CTUs.

13. The decoder according to claim 10, wherein for a current $CTU_{i,j}$ at $i^{th}$ CTU row and $j^{th}$ CTU column, the processor is configured to determine an IBC reference area comprising a plurality of neighbouring CTUs within a fixed range from the current $CTU_{i,j}$, and determine a neighbouring $CTU_{a, b}$ at $a^{th}$ CTU row and $b^{th}$ CTU column in the IBC reference area as being unavailable if $b−j≥(i−a)×N$ when the wavefront delay is N CTUs.

14. The decoder according to claim 13, wherein the processor is configured to decode an IBC block vector from the bitstream, and determine the prediction block in the at least one neighbouring CTU within the IBC reference area for the current CU using the IBC block vector, wherein the IBC block vector is determined as illegal if the IBC block vector points to an area outside the IBC reference area, modified to point to in area inside the IBC reference area by a mapping function, or binarised to a codeword space that is bounded within limits of the IBC reference area.

15. A video coding method, applied to an encoder, comprising:

retrieving a current frame of a video;
dividing the current frame into a plurality of CTUs;
determining an availability of at least one neighbouring CTU of a current CTU in the current frame according to a wavefront delay, wherein the wavefront delay is a delay in units of CTUs in a row direction between the current CTU at a current CTU row and the neighbouring CTU at a previous CTU row which are coded in parallel;
performing an intra prediction on a current CU of the current CTU to obtain a prediction block from the at least one neighbouring CTU; and
encoding a block vector pointing to the prediction block into a bitstream corresponding to the current frame.

16. The method according to claim 15, wherein the step of determining an availability of at least one neighbouring CTU of the current CTU in the current frame according to a wavefront delay comprises:

for a current $CTU_{i,j}$ at $i^{th}$ CTU row and $j^{th}$ CTU column, determining a neighbouring $CTU_{a, b}$ at $a^{th}$ CTU row and $b^{th}$ CTU column as being unavailable if $b−j≥(i−a)×N$ when the wavefront delay is N CTUs.

17. The method according to claim 15, wherein the step of determining an availability of at least one neighbouring CTU of the current CTU in the current frame according to a wavefront delay comprises:

for a current $CTU_{i,j}$ at $i^{th}$ CTU row and $j^{th}$ CTU column, determining an IBC reference area comprising a plurality of neighbouring CTUs within a fixed range from the current $CTU_{i,j}$, and determining a neighbouring $CTU_{a,\,b}$ at $a^{th}$ CTU row and $b^{th}$ CTU column in the IBC reference area as being unavailable if $b-j\geq(i-a)\times N$ when the wavefront delay is N CTUs.

18. An encoder, comprising:

a communication interface, configured to retrieve a current frame of a video;

a storage device, configured to store at least one computer executable instruction; and a processor, coupled to the communication interface and the storage device, and configured to execute the at least one computer executable instruction to perform the method of claim 15.

19. The encoder according to claim 18, wherein for a current $CTU_{i,j}$ at $i^{th}$ CTU row and $j^{th}$ CTU column, the processor is configured to determine a neighbouring $CTU_{a,\,b}$ at $a^{th}$ CTU row and $b^{th}$ CTU column as being unavailable if $b-j\geq(i-a)\times N$ when the wavefront delay is N CTUs.

20. The encoder according to claim 18, wherein for a current $CTU_{i,j}$ at $i^{th}$ CTU row and $j^{th}$ CTU column, the processor is configured to determine an IBC reference area comprising a plurality of neighbouring CTUs within a fixed range from the current $CTU_{i,j}$, and determine a neighbouring $CTU_{a,\,b}$ at $a^{th}$ CTU row and $b^{th}$ CTU column in the IBC reference area as being unavailable if $b-j\geq(i-a)\times N$ when the wavefront delay is N CTUs.

* * * * *